United States Patent
Grimm

(10) Patent No.: US 12,442,239 B2
(45) Date of Patent: Oct. 14, 2025

(54) ELECTRIC MOTOR-POWERED FURNITURE DRIVE

(71) Applicant: Julius Blum GmbH, Hoechst (AT)

(72) Inventor: Matthias Grimm, Altach (AT)

(73) Assignee: Julius Blum GmbH, Hoechst (AT)

( * ) Notice: Subject to any disclaimer, the term of this patent is extended or adjusted under 35 U.S.C. 154(b) by 155 days.

(21) Appl. No.: 18/376,220

(22) Filed: Oct. 3, 2023

(65) Prior Publication Data
US 2024/0102332 A1    Mar. 28, 2024

Related U.S. Application Data

(63) Continuation of application No. PCT/AT2022/060139, filed on Apr. 27, 2022.

(30) Foreign Application Priority Data

Apr. 30, 2021 (AT) .............................. A 50337/2021

(51) Int. Cl.
E05F 15/63    (2015.01)

(52) U.S. Cl.
CPC .......... *E05F 15/63* (2015.01); *E05Y 2400/326* (2013.01); *E05Y 2400/44* (2013.01); *E05Y 2600/56* (2013.01); *E05Y 2600/58* (2024.05); *E05Y 2900/20* (2013.01)

(58) Field of Classification Search
CPC .......... H02H 7/09; H02P 1/021; H02P 29/02; H02M 7/5387; H02M 1/32
See application file for complete search history.

(56) References Cited

U.S. PATENT DOCUMENTS

| | | | |
|---|---|---|---|
| 8,590,990 B2 | 11/2013 | Friesenecker | |
| 8,692,497 B2 | 4/2014 | Vogel et al. | |
| 8,807,670 B2 | 8/2014 | Blum | |
| 9,277,817 B2 | 3/2016 | Blum | |
| 10,590,692 B2 | 3/2020 | Bohle | |
| 10,988,966 B2 | 4/2021 | Haemmerle et al. | |
| 11,725,444 B2 | 8/2023 | Bohle | |
| 2011/0169388 A1* | 7/2011 | Vogel | E05D 15/40 312/319.2 |
| 2012/0049709 A1 | 3/2012 | Scheffknecht et al. | |

(Continued)

FOREIGN PATENT DOCUMENTS

| | | |
|---|---|---|
| AT | 519935 | 11/2018 |
| EP | 2 315 897 | 4/2015 |

(Continued)

OTHER PUBLICATIONS

International Search Report issued Jul. 20, 2022 in International (PCT) Application No. PCT/AT2022/060139.

*Primary Examiner* — Said Bouziane
(74) *Attorney, Agent, or Firm* — Wenderoth, Lind & Ponack, L.L.P.

(57) ABSTRACT

An electric motor-powered furniture drive includes an electric motor; an interface via which the electric motor-powered furniture drive can be connected to a mechanical actuator; and an identification device for automatically identifying a configuration of the mechanical actuator. Regions of the identification device are located on the interface such that the configuration of the mechanical actuator can be identified when the electric motor-powered furniture drive is connected to the mechanical actuator.

26 Claims, 33 Drawing Sheets

(56) References Cited

U.S. PATENT DOCUMENTS

| | | |
|---|---|---|
| 2012/0056521 A1 | 3/2012 | Friesenecker |
| 2012/0161598 A1 | 6/2012 | Blum |
| 2014/0319987 A1 | 10/2014 | Blum |
| 2019/0010747 A1 | 1/2019 | Bohle |
| 2020/0063484 A1 | 2/2020 | Haemmerle et al. |
| 2021/0355729 A1 | 11/2021 | Bohle |

FOREIGN PATENT DOCUMENTS

| | | |
|---|---|---|
| EP | 3 443 191 | 1/2020 |
| JP | 2012-500916 | 1/2012 |
| JP | 2012-526926 | 11/2012 |
| JP | 5623403 | 11/2014 |
| JP | 5739414 | 6/2015 |
| JP | 2022-519077 | 3/2022 |
| WO | 2010/022413 | 3/2010 |
| WO | 2010/129979 | 11/2010 |
| WO | 2011/020130 | 2/2011 |
| WO | 2012/155165 | 11/2012 |

* cited by examiner

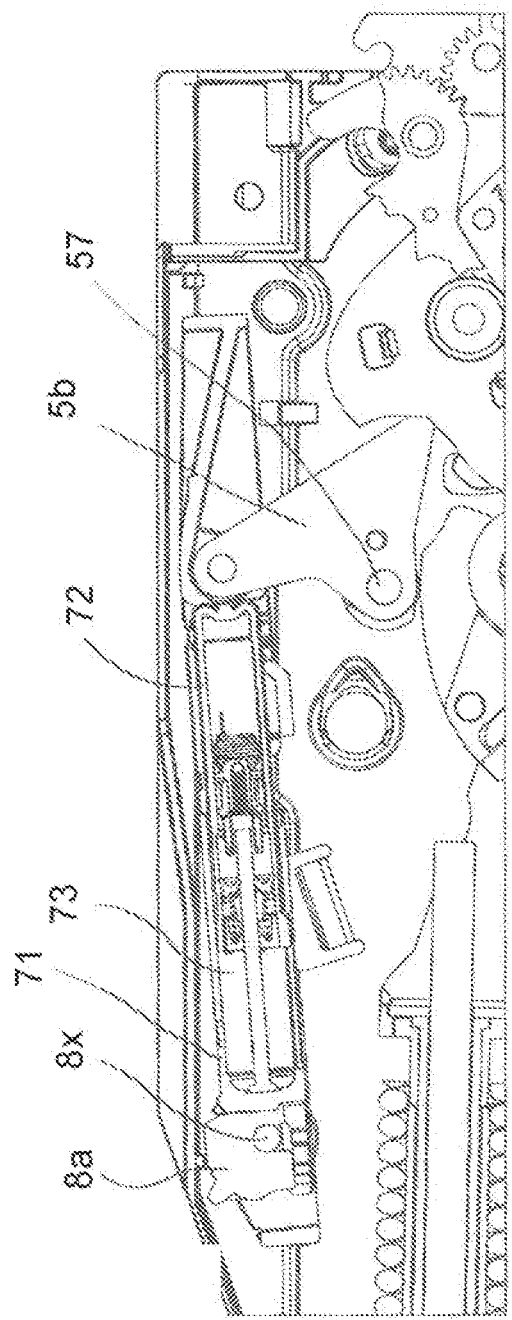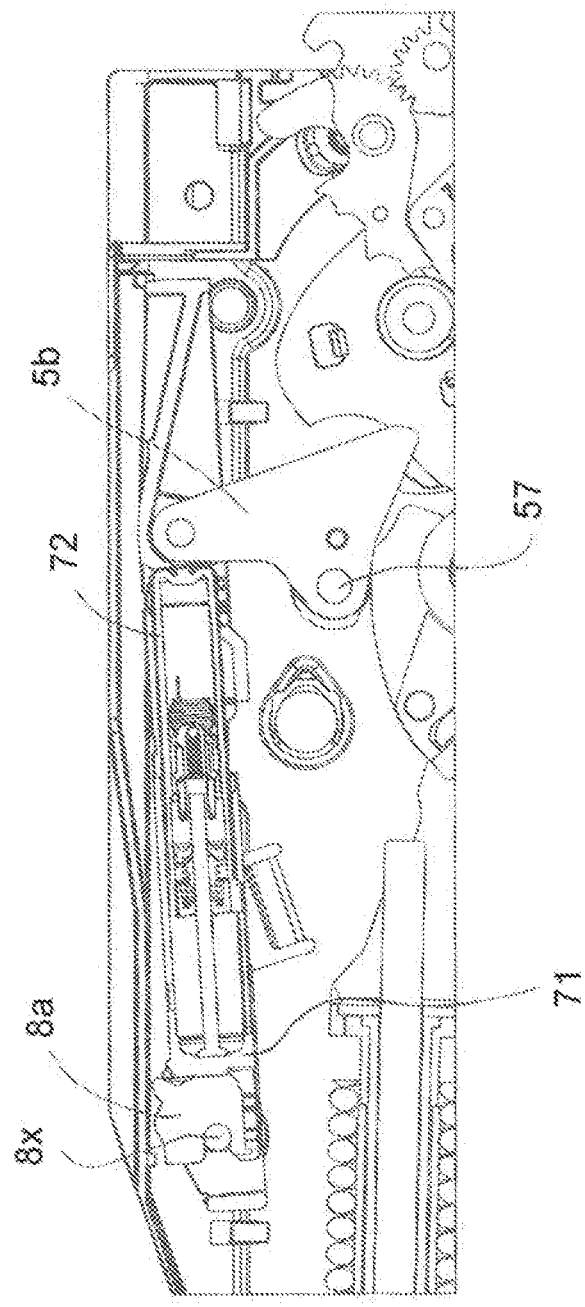

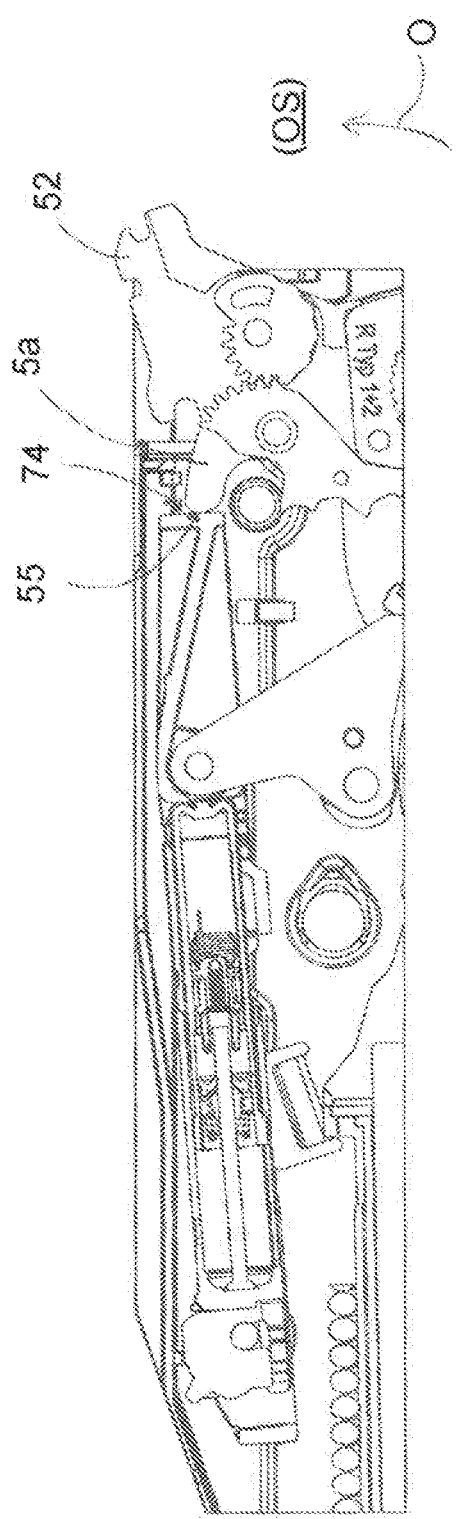
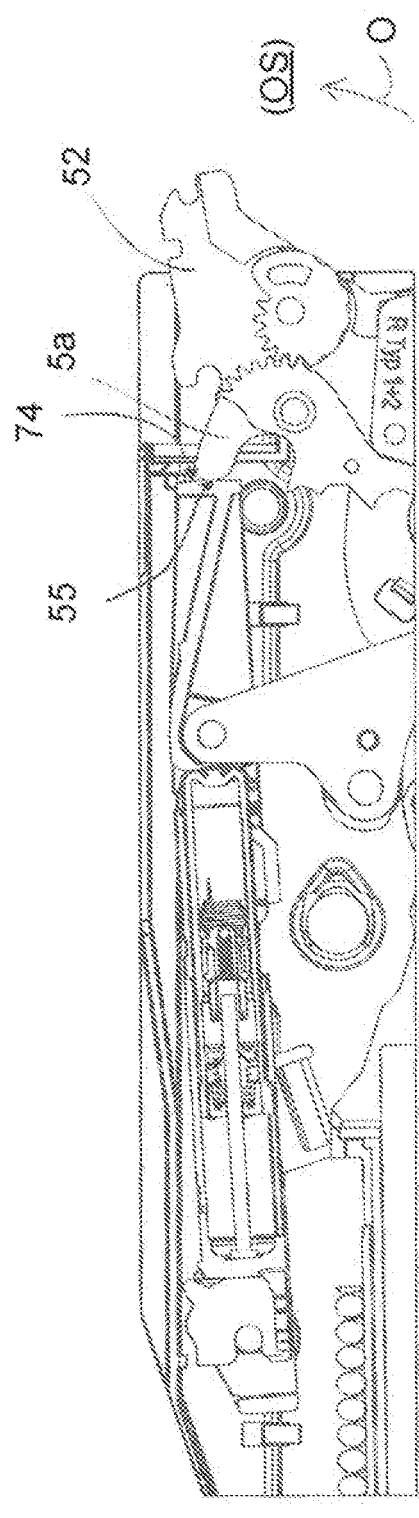

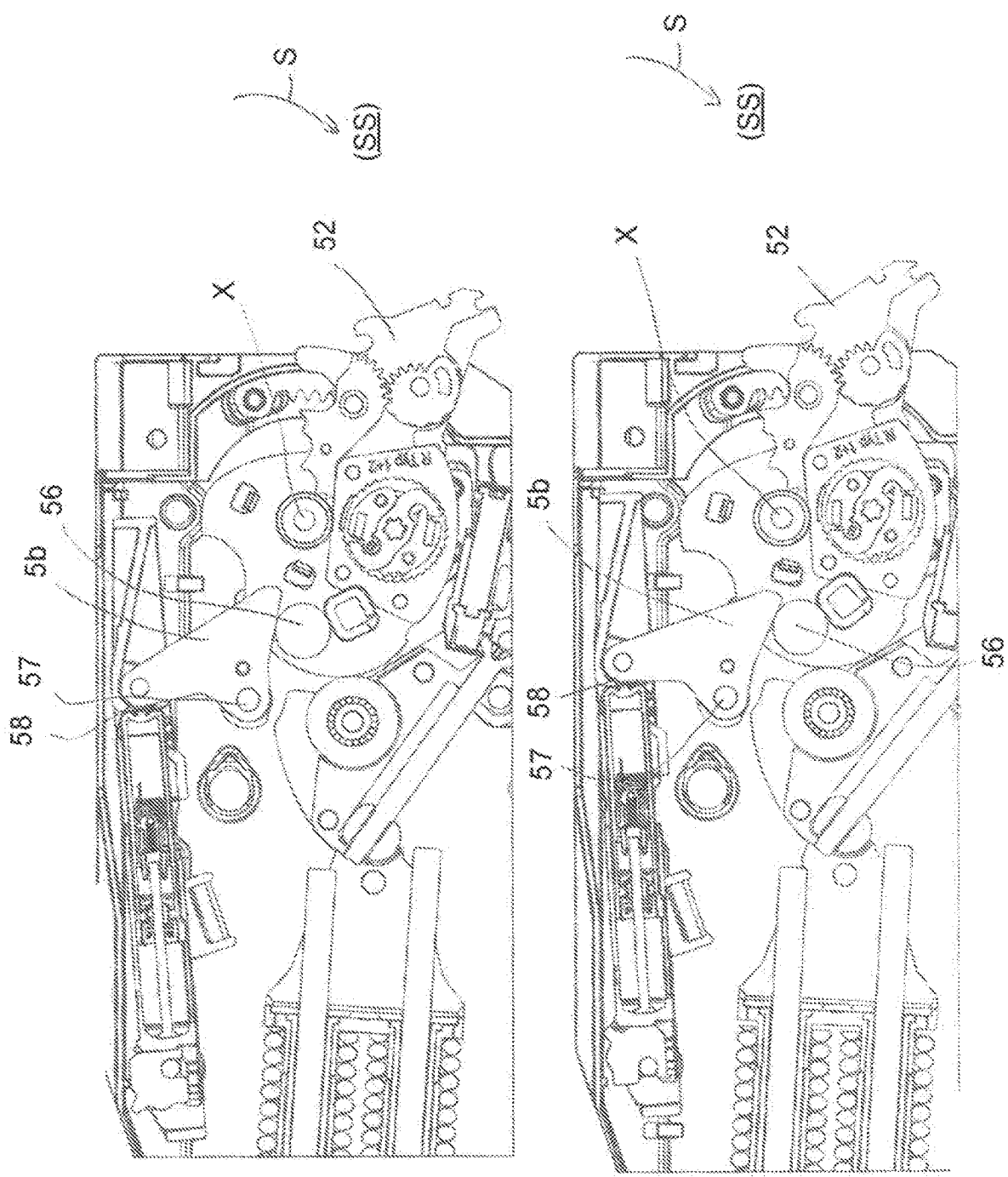

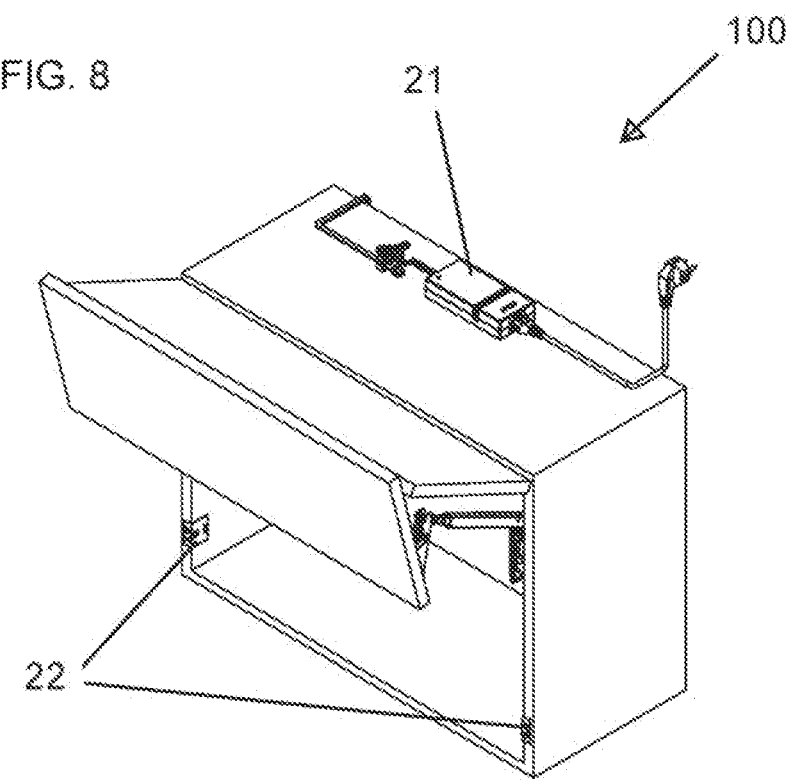

FIG. 23
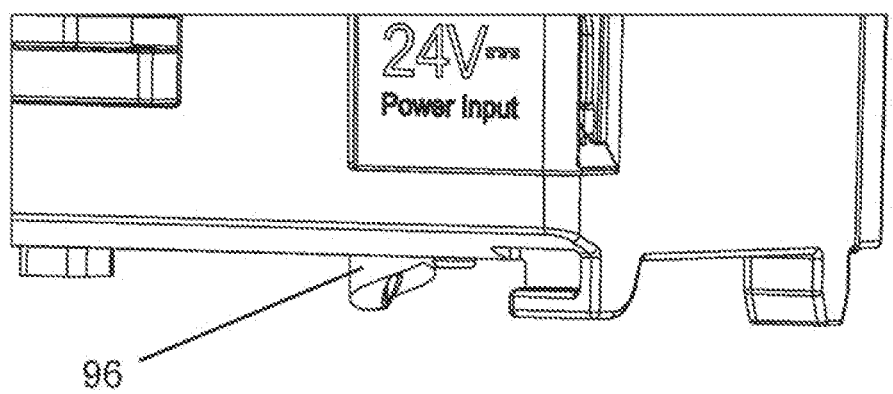
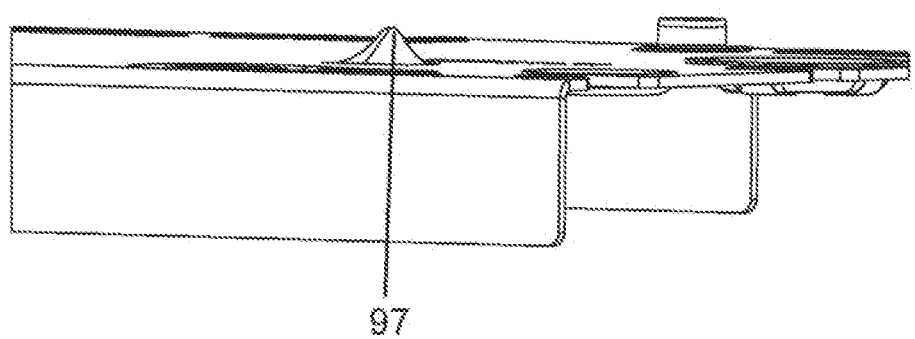

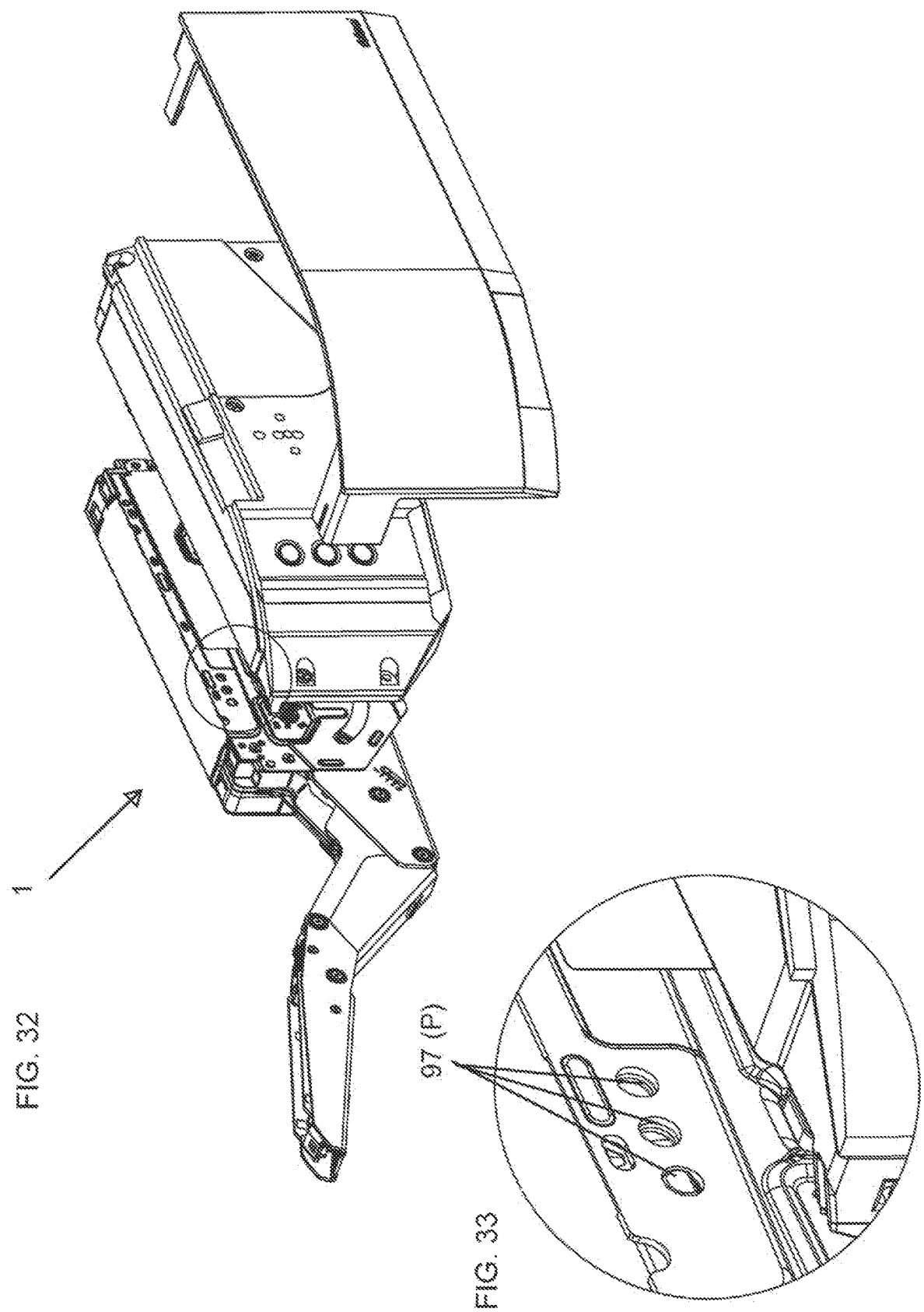

ELECTRIC MOTOR-POWERED FURNITURE DRIVE

BACKGROUND OF THE INVENTION

The present invention relates to an electric motor-powered furniture drive with at least one electric motor, at least one interface via which the electric motor-powered furniture drive can be connected, preferably releasably, to a mechanical actuating drive, and at least one identification device for the automatic identification of a configuration of the mechanical actuating drive. In addition, the invention relates to a furniture drive system for a movable furniture part, in particular for a furniture flap in the form of a bi-fold lift flap, an up and over lift flap or a lift up flap type of furniture flap, with such an electric motor-powered furniture drive and a mechanical actuating drive. Furthermore, the invention relates to a piece of furniture with such a furniture drive system and a method for operating the furniture drive system.

Furniture drive systems with actuating arm devices have been used for many decades to move furniture flaps which are rotatable or pivotable about a horizontal axis or are displaceable along a vertical plane. Examples of such furniture fittings follow from WO 2012/155165 A2 and WO 2011/020130 A1.

In addition, furniture drive systems are known in which these systems have two assemblies that are separate from each other, namely a mechanical actuating drive (comprising an energy storage mechanism) and an electric motor-powered furniture drive. Examples of this follow from EP 3 443 197 B1 and AT 519 935 A1.

In the case of such furniture drive systems it is important that the same systems can be used equally in the case of movable furniture parts of different sizes and weights. For this, individual parameters (e.g. force) of the drive device (comprises the energy storage mechanism and optionally a damping device) and/or of the electric motor can be set via the setting devices.

In the case of the earlier furniture drive systems it can come about that the effect emanating from the drive device is not compatible with the driven movable furniture part. In some cases this can result in damage to the movable furniture part or even in accidents with a person actuating the movable furniture part.

In order to prevent incorrect inputs of operating parameters, an electric motor-powered furniture flap drive which has an identification device for the automatic identification of the type of furniture flap of the furniture flap drive from the possible types of furniture flap of bi-fold lift flap, up and over lift flap and lift up flap is known from EP 2 315 897 B1. This identification device is connected to a travel measuring device, by which the travel that can be covered by the actuating arm between its two end positions can be ascertained, wherein the identification apparatus identifies the type of flap in dependence on the measurement result of the travel measuring device.

A disadvantage of this state of the art is that, for the identification, the entire furniture flap drive needs to be assembled and also a movement of the actuating arm already needs to be carried out. It can thus occur that, in the case of incompatible assemblies or component parts, damage or undesired movements that are dangerous for a user already occur during the testing or identification movement.

SUMMARY OF THE INVENTION

The object of the present invention is therefore to avoid these problems. In particular, the identification of the configuration is to be simplified.

Accordingly, the at least one identification device is arranged on the at least one interface of the electric motor-powered furniture drive at least in regions, with the result that the configuration of the mechanical actuating drive can be identified when the electric motor-powered furniture drive is connected to the mechanical actuating drive. The connection is thus already sufficient to carry out the identification successfully. No movement of the furniture drive components needs to be effected.

According to a preferred embodiment, a control device is provided with which the electric motor can be controlled. Preferably this control device is integrated in a housing of the electric motor-powered furniture drive. For example, this control device can have a printed circuit board and a microprocessor arranged thereon as well as optionally further circuit components.

Furthermore, preferably several data sets relating to different configurations of the mechanical actuating drive are stored in the control device, preferably in a storage device.

Various sensors, via which a parameter of the mechanical actuating drive can be detected, can be used for the identification device. For example, pressure sensitive mats, contact springs, micro push buttons, magnetic proximity sensors, magnetic angle sensors or capacitive angle sensors can be used for tactile recognition.

It is particularly preferable that the identification device can carry out a comparison of the parameter detected by the sensor with the data sets and identify the current configuration of the mechanical actuating drive, wherein, via the control device, control signals can be output to the electric motor depending on the current configuration of the mechanical actuating drive identified via the identification device.

These control signals can then be used to be able to output operating parameters appropriate for the configuration during operation. The electric motor can therefore be actuated appropriately for the mechanical actuating drive.

The interface should be formed such that a secure but nevertheless releasable connection between the electric motor-powered furniture drive and the mechanical actuating drive is possible in a simple manner. It is particularly preferably provided that the interface has a substantially flat connecting plate—preferably oriented along a vertical plane in the installed state—and connecting elements arranged on the connecting plate for the releasable connection of the electric motor-powered furniture drive to connecting counterpieces formed on the mechanical actuating drive.

For the specific design of the identification device, there is the possibility that a recognition of the configuration is effected via RFID modules or radio modules.

It is particularly preferable that the identification device has at least one mechanical tracer element, which is rotatably mounted on the at least one interface.

Through at least one rotatable tracer element—for example in interaction with a corresponding tracer element counterpiece such as a tracing surface—a large number of different configurations and/or parameters can be coded compactly and with a small number of component part components (such as for example via a rotary slide, which decodes or represents a large number of specific configurations and/or parameters through—in particular equidistantly arranged—regions, associated with them, of the rotatable tracer element and/or the tracer element counterpiece).

For a simpler and less expensive design, however, the identification device has at least one mechanical tracer element, which rests against at least one tracer element counterpiece of the mechanical actuating drive, representing a parameter of the mechanical actuating drive, in the case of connection between the electric motor-powered furniture drive and the mechanical actuating drive provided via the interface.

In order to enable a reliable and meaningful identification via this mechanical tracer element it is preferable that the at least one mechanical tracer element is movably, preferably rotatably or displaceably, mounted on the at least one interface.

According to a first variant, the rotatably mounted tracer element is rotatable about an axis of rotation—preferably oriented at right angles to the vertical plane, wherein the rotatably mounted tracer element has a tracing surface that faces away from the interface and is inclined relative to the axis of rotation, preferably by an angle of between 30° and 60°.

Furthermore, it is preferable that the inclined tracing surface has a tracing line closest to the interface, lying on the tracing surface and leading away from the axis of rotation, and a tracing line furthest from the interface, lying on the tracing surface and leading away from the axis of rotation.

In addition, the tracing line closest to the interface and the tracing line furthest from the interface are 180° apart from each other starting from the axis of rotation.

A surface, which is substantially oval in a top view and can slide along the tracer element counterpiece, lies between these two tracing lines.

For a reliable identification even in the case of imprecise assembly of the furniture drive and of the actuating drive, it is particularly preferable that the tracing line furthest from the interface also forms a tracing lug that can be moved into the tracer element counterpiece.

Protection is also sought for a furniture drive system for a movable furniture part, in particular for a furniture flap in the form of a bi-fold lift flap, an up and over lift flap or a lift up flap type of furniture flap, with an electric motor-powered furniture drive according to the invention and a mechanical actuating drive.

The mechanical actuating drive of the furniture drive system preferably has the following essential components:
- a support for fitting the furniture drive system on a furniture carcass,
- an actuating arm device that is movably, preferably rotatably, mounted on the support and can be connected to the movable furniture part, wherein the electric motor is connected or can be connected to the actuating arm device and can be used to move the actuating arm device at least in portions, and
- at least one energy storage mechanism, preferably in the form of a spring assembly, which on one side engages on the support and on the other side engages, preferably indirectly, on the actuating arm device.

Furthermore, it is preferable that the electric motor-powered furniture drive is implemented as an assembly formed separately from the mechanical actuating drive and these can be connected or are connected to each other via the interface.

In order to enable a transmission of movement between the assemblies, it is preferable that the electric motor-powered furniture drive has a driver, which can be driven by the at least one electric motor, for transmitting a torque of the electric motor to the actuating arm device of the mechanical actuating drive.

With respect to the configuration of the mechanical actuating drive, there are various properties essential to the operation. Two particularly important properties are the type of furniture flap and the power factor of the energy storage mechanism. If, for example, there are three different configurations in each case, then this results in a total of nine different combinations.

Accordingly, the configuration of the mechanical actuating drive can preferably be selected from the group: actuating drive for the bi-fold lift flap type of furniture flap, actuating drive for the up and over lift flap type of furniture flap and actuating drive for the lift up flap type of furniture flap. In addition (or alternatively) it can be provided that the configuration of the mechanical actuating drive is selected from a group of mechanical actuating drives which are constructed substantially identical and differ from each other, preferably only, by a power factor of the energy storage mechanism.

With respect to the power factor, it can be mentioned that there are, for example, energy storage mechanisms with a high force, with a medium force and with a low force.

With respect to the types of furniture flap, the following may be mentioned:

There are furniture flaps, which have become known as stay lift flaps for example, in which the flap is fastened to the underside of the cabinet top by means of hinges.

Furthermore, there are flaps implemented in two parts, wherein a first partial flap is pivotably connected to the furniture carcass and a second partial flap is pivotably connected to the first partial flap. When transferring the flap into the open position, the first partial flap is pivoted upwards away from the furniture carcass, wherein the second partial flap is pivoted, likewise upwards, towards the furniture carcass, with the result that the flap is folded together in the open position (bi-fold lift flap).

In the case of up and over lift flaps the flap is pivoted towards the back over the furniture carcass.

If the flap performs a movement substantially parallel to the front side of the furniture carcass preferably during its entire opening and closing travel, then it is called a lift up flap.

This terminology is also to be retained in the context of the present invention, wherein the enumeration of the different types of furniture flap (and also of the power factors and optionally other identifiable actuating drive parameters) is not to be understood as exhaustive.

It is preferable that the energy storage mechanism is formed in order to compensate for a weight force of the actuating arm device and of the furniture part that can be connected to the actuating arm device and/or in order to move the actuating arm device in the direction of a fully closed position and/or in order to move the actuating arm device in the direction of a fully open position. Thus, the movable furniture part can be opened as far as a certain angular position, in which the movable furniture part then remains in a state balanced by the actuating arm device and the energy storage mechanism.

In addition to the energy storage mechanism, the mechanical actuating drive has a damping device, with which a closing movement and/or an opening movement of the actuating arm device can be damped. A smooth closing and opening, above all reaching the respective end position softly, is thus made possible.

In general, it is preferable that the actuating arm device is movable between a first maximum position, which corresponds to the closed position between movable furniture part and furniture carcass, and a second maximum position, which corresponds to the maximum open position of the movable furniture part relative to the furniture carcass.

In principle, it is possible that the damping device damps the entire movement path of the actuating arm device.

However, it is preferable that the damping via the damping device is effected in a portion of the movement of the movable furniture part upstream of the closed position and the maximum open position.

Specifically, the (respectively) upstream movement portion can correspond to a pivoting angle range of the actuating arm device (and thus indirectly of the movable furniture part) of between 2° and 25°, preferably between 5° and 15°.

For a transmission and conversion of movement within the electric motor-powered furniture drive, a gear mechanism can be provided between the electric motor and the driver.

With respect to this gear mechanism, it is preferable that it comprises at least two gear stages, a freewheel clutch and/or an overload clutch.

A transmission and conversion of movement is also advantageous in the region of the mechanical actuating drive, wherein a transmission mechanism is preferably provided, with which the force of the energy storage mechanism can be transmitted to the actuating arm device.

In order to enable a pulling-to and opening movement of the actuating arm device, it is preferable that the transmission mechanism has a control cam and a pressure roller loaded by the energy storage mechanism, wherein the pressure roller can be moved along the control cam during a movement of the at least one actuating arm.

Furthermore, it is preferable that the actuating arm device has a movably mounted actuator for the transmission of a force from the energy storage mechanism to the actuating arm.

In order to connect or to link the mechanical actuating drive to the electric motor-powered furniture drive, it is preferable that the actuator has a transmission opening, in which the driver that is drivable by the electric motor engages or can engage.

Protection is also sought for a piece of furniture with a furniture carcass, at least one furniture part that is movable, in particular about a horizontal axis, in particular in the form of a bi-fold lift flap, lift up flap or up and over lift flap, and a furniture drive system according to the invention.

The above-mentioned object is also achieved by a method. According to this, in the case of a furniture drive system, a connection of the electric motor-powered furniture drive to the mechanical actuating drive via the at least one interface and an automatic identification of a configuration of the mechanical actuating drive via the identification device when the electric motor-powered furniture drive is connected to the mechanical actuating drive via the at least one interface are provided according to the invention.

For the said identification, the following steps are preferable:
- detecting a parameter of the mechanical actuating drive via a sensor of the identification device,
- comparing the parameter detected by the sensor with stored data sets relating to different configurations of the mechanical actuating drive,
- identifying the current configuration of the mechanical actuating drive with reference to the stored data sets and
- outputting a control signal to the electric motor in dependence on the current configuration of the mechanical actuating drive identified via the identification device.

In different words in some cases, the present invention can also be described as follows:

Overall, it involves a type recognition in the case of a furniture drive system comprising a mechanical actuating drive and an electric motor-powered furniture drive. The recognition of the type of furniture flap is already effected when the electric motor-powered furniture drive is fitted on (thus when it is connected to) the mechanical actuating drive. Both the type of furniture flap present—thus bi-fold lift, up and over lift or lift up flap—and the energy storage mechanism power factor present are recognized. Each type of furniture flap/power factor combination corresponds to a configuration.

The recognition of the configuration has an influence on many operating parameters of the furniture drive system:
- opening angle
- movement profile
- front angle calculation
- reference movement
- recognition as to whether the assemblies are correctly fitted
- energy storage mechanism fault recognition
- statistical analysis (e.g. in the case of a complaint)
- assistance for the fitter According to a preferred variant, the displaceably mounted tracer element has at least two separate tracing pins protruding from the interface—preferably at right angles to the vertical plane. If two tracing pins are present, four different configurations can be detected with them in a binary manner. In the case of three tracing pins, there are correspondingly eight different detectable configurations.

It is preferable that the displaceably mounted tracer element, preferably tracing pin, can be brought into contact with a conductor path, wherein the conductor path comprises at least one conductor path contour, preferably numbering two and/or formed star-shaped, for determining a parameter of the mechanical actuating drive.

In this context, star-shaped is to be interpreted such that bar-like conductor path contour segments protrude transversely from the conductor path contour. Particularly preferably, the bars of the conductor path contours are arranged next to each other in regions.

It is preferable that the displaceably mounted tracer element, preferably a tracing pin, comprises a first spring, which is preferably arranged inside the tracing pin at least in regions, for determining a parameter of the mechanical actuating drive, and/or a second spring, preferably arranged on the outside of the tracing pin.

Through the first spring, a restoring action of the tracer element via the second spring can be supported and can produce an electrical contact with the conductor path in terms of a dual function.

Preferably, the first spring is galvanically isolated from the tracing pin and/or can be brought into contact with the conductor path, preferably with at least two conductor path contours.

If there is a galvanic isolation between the first spring and the tracing pin, the tracing pin can be formed, for example, from plastic, wherein metallic materials can also be provided for the tracing pin. Through the first spring, an electrical contact between two spatially separate regions of the two conductor path contours can be generated, as a result of which an identification of parameters of the mechanical actuating drive can be ascertained.

Through the first spring, use can be made of a multiple function of increasing the restoring force, of electrical connection to the conductor path as well as the possible formation of the tracing pin in the form of plastic.

It is preferable that the mechanical actuating drive can be ascertained via a combination of at least one parameter determined via the identification device and an opening angle of the mechanical actuating drive that can preferably be determined through a reference movement of the furniture drive system.

The functionality of the identification device is thereby extended via the additional information of an opening angle of the mechanical actuating drive.

It is preferable that the displaceably mounted tracer element has at least one tracing pin protruding from the interface—preferably at right angles to the vertical plane—wherein it is preferably provided that the displaceably mounted tracer element can be arranged on an optionally present conductor path and/or is arranged on the mechanical actuating drive for contacting a defined region of the optionally present conductor path.

Via a contacting of the tracer element or of the tracing pin at a defined position along the conductor path a parameter of the mechanical actuating drive can be determined, wherein the conductor path—for example in the case of a tracing pin arranged on the mechanical actuating drive—can be arrangeable on a region of the conductor path specific to the mechanical actuating drive.

BRIEF DESCRIPTION OF THE DRAWINGS

Further details and advantages of the present invention are explained in more detail below via the description of the invention with reference to the embodiments represented in the drawings, in which:

FIG. 8, is a perspective view of the piece of furniture with open bi-fold lift flap, FIGS. 23-25, are perspective views of the connection of the furniture drive to the actuating drive in different positions, FIGS. 31-42, are perspective views of a furniture drive system and individual regions and component parts of this system in each case with an alternative embodiment variant of the mechanical tracer element in the form of three tracing pins.

DETAILED DESCRIPTION OF THE INVENTION

Figure 1:
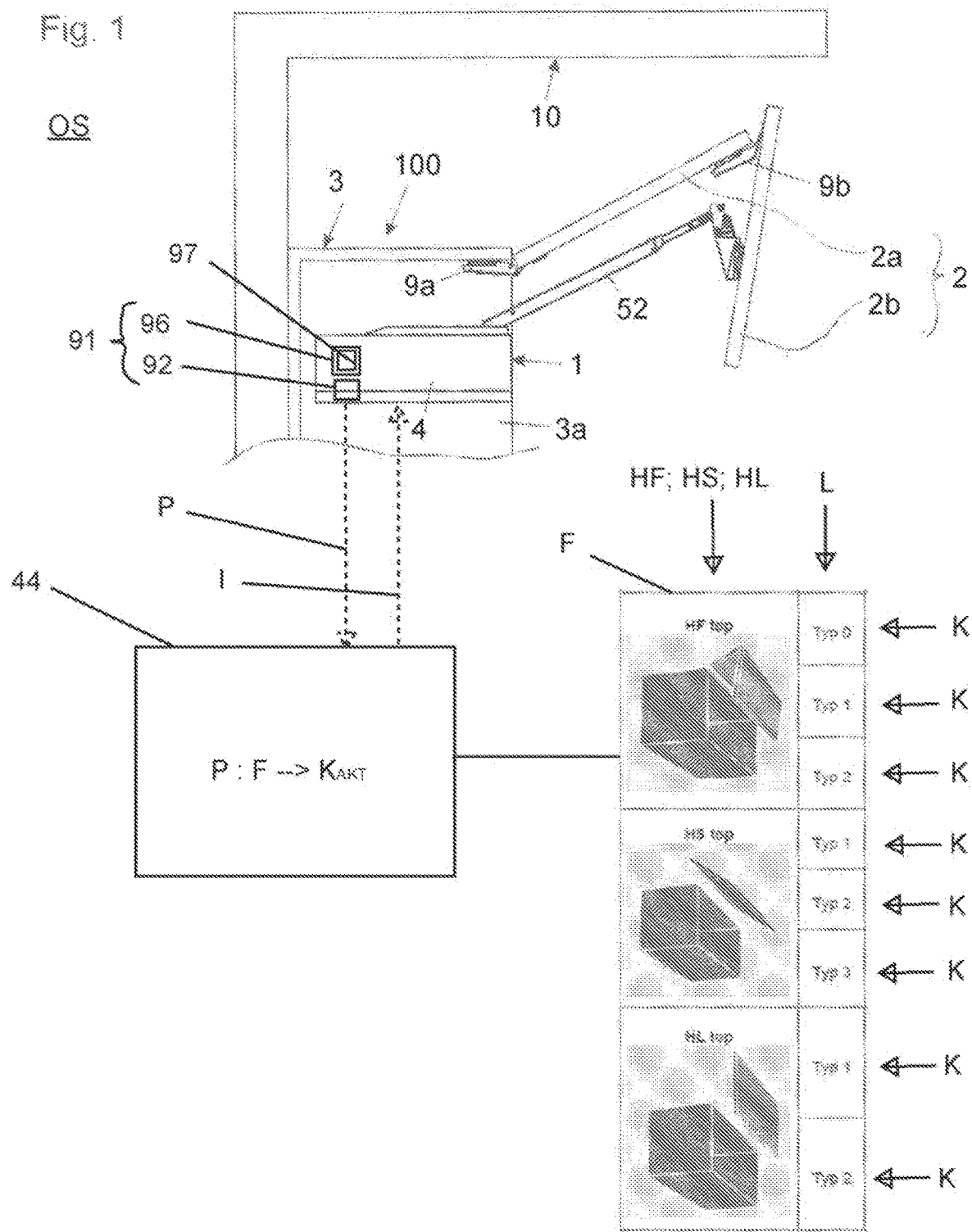
FIG. 1, schematically shows a piece of furniture with a furniture drive system for a furniture flap.

FIG. 1 shows a piece of furniture 100 with a furniture carcass 3, wherein a furniture drive system 1 (furniture fitting) for moving a movably mounted furniture part 2 is fastened to a side wall 3a of the furniture carcass 3.

In the embodiment shown, the movable furniture part 2 has two furniture flaps 2a, 2b, wherein a first furniture flap 2a is connected, pivotable about a horizontally running axis of rotation, to the furniture carcass 3 via at least two hinges 9a and the second furniture flap 2b is connected, pivotable about a horizontally running axis of rotation, to the first furniture flap 2a via at least two hinges 9b.

The furniture drive system 1 has a support 4 to be fastened to the furniture carcass 3, preferably to the side wall 3a of the furniture carcass 3, and at least one actuating arm 52, which is pivotable relative to the support 4 and is connected to the movable furniture part 2, preferably to the second furniture flap 2b.

It can be recognized that the piece of furniture 100 is arranged spaced apart from the ceiling 10 in FIG. 1. In FIG. 1 the actuating arm 52 encloses a relatively large pivot angle, which corresponds to the maximum open position OS of the movable furniture part 2.

Figure 2A:
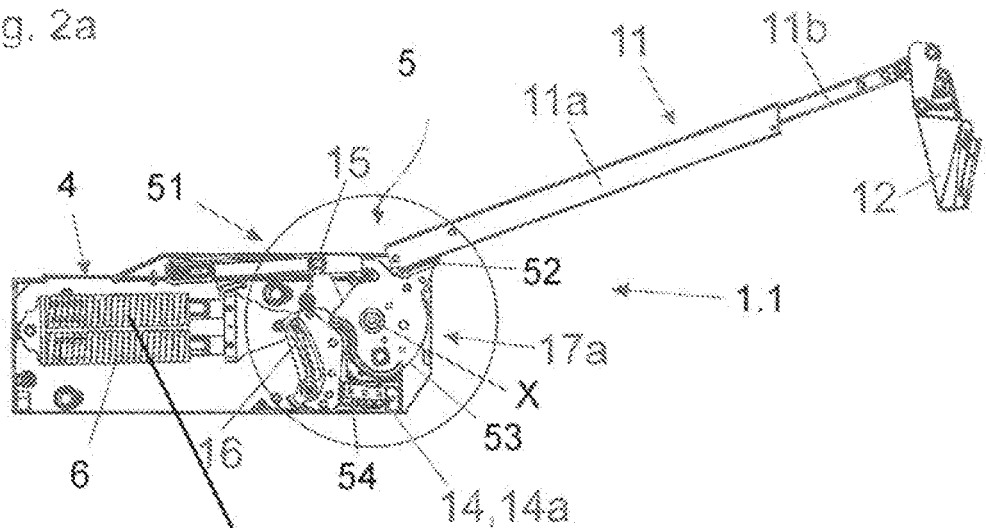
FIG. 2a is a view of a mechanical actuator unit with an actuating arm device and an energy storage mechanism.

FIG. 2a shows the mechanical actuating drive 1.1 of the furniture drive system 1 in a side view, wherein the mechanical actuating drive 1.1 has a support 4 to be fastened to the furniture carcass 3 and at least one actuating arm 52, which is mounted on the support 4, pivotable about a pivot pin X.

In the embodiment shown, an actuating arm extension 11 is releasably arranged on the actuating arm 52, wherein the actuating arm extension 11 has two actuating arm parts 11a, 11b that are displaceable relative to each other. It is preferably provided that the actuating arm parts 11a, 11b are telescopically displaceable relative to each other, wherein the first actuating arm part 11a can be releasably connected to the actuating arm 52. The second actuating arm part 11b has a fastening device 12, which can be releasably connected to a fitting part to be fastened to the movable furniture part 2, preferably can be locked and unlocked without a tool.

To apply force to the actuating arm 52 of the actuating arm device 5, an energy storage mechanism 6 is provided, which can have, for example, at least one helical spring, preferably at least one compression spring. Alternatively, the energy storage mechanism 6 can also have other energy storage mechanisms, such as for example a fluid storage mechanism in the form of a gas spring.

The actuating arm device 5 has a transmission mechanism 51 for transmitting a force of the energy storage mechanism 6 to the at least one actuating arm 52. It is preferably provided that the transmission mechanism 51 has a control cam 53 and a pressure roller 54 loaded by the energy storage mechanism 6, wherein the pressure roller 54 can be moved along the control cam 53 during a movement of the at least one actuating arm 52.

According to a preferred embodiment, the control cam 53 can be arranged or formed on the actuating arm 52. Of course, it is also possible to arrange the control cam 53 at a different place in the transmission mechanism 51 of the actuating arm device 5.

Figure 2B:
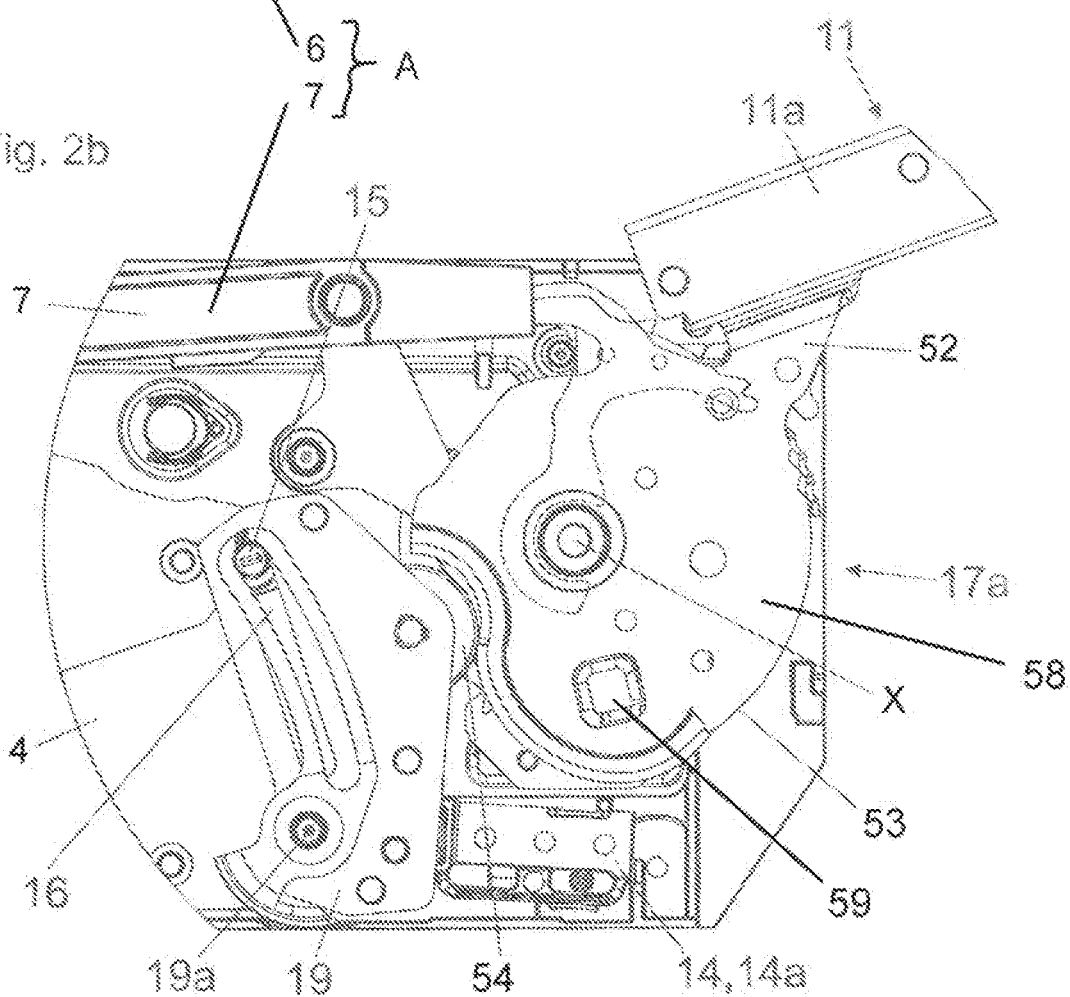
FIG. 2b is a detail from FIG. 2a, FIGS. 3a+3b are perspective representations of the mechanical actuator unit, FIGS. 4a+4b are longitudinal sections through the mechanical actuator unit in an intermediate open position, FIGS. 5a+5b are details relating to FIGS. 4a and 4b, FIGS. 6a+6b are longitudinal sections through the mechanical actuator unit in a furniture part position upstream of the maximum open position, wherein in each case the damping starting position is given, FIGS. 7a+7b are longitudinal sections through the mechanical actuator unit in a furniture part position upstream of the closed position, wherein in each case the damping starting position is given.

In the case represented in FIG. 2b the actuating arm 52 is [formed] in one piece with an actuator 55 for the transmission of a force from the energy storage mechanism 6 to the actuating arm 52. The control cam 53 is formed on this actuator 55. In addition, the transmission opening 59, in which the driver 31 that can be driven by the electric motor 30 engages or can engage, is formed in this actuator 58.

A force of the energy storage mechanism 6 onto the at least one actuating arm 52 can be set by an energy storage mechanism setting unit 14. It is preferably provided that
  the energy storage mechanism setting unit 14 has at least one rotatably mounted setting wheel 14a, wherein a force of the energy storage mechanism 6 onto the actuating arm 52 acting on the at least one actuating arm 52 can be set by a rotation of the setting wheel 14a, and/or
  the energy storage mechanism setting unit 14 has at least one threaded spindle 16, along which a point of application 15 of the energy storage mechanism 6 is movable when the energy storage mechanism setting unit 14 is actuated and/or
  the support 4 has a front face with at least one opening 17a, through which the at least one actuating arm 52 protrudes in an open position, wherein a setting wheel 14a of the energy storage mechanism setting unit 14 can be actuated through the opening 17a from a direction transverse to the front face.

FIG. 2b shows the region circled in FIG. 2a in an enlarged view. The transmission mechanism 51 has an intermediate lever 19, which is mounted on the support 4, pivotable about a pivot pin 19a. The threaded spindle 16 is mounted on the intermediate lever 19. Through a rotation of the setting wheel 14a of the energy storage mechanism setting unit 14 by means of a tool, the threaded spindle 16 can be rotated, as a result of which the point of application 15 of the energy storage mechanism 6 moves along the threaded spindle 16. In this way, the relative distance between the point of application 15 and the pivot pin 19a of the intermediate lever 19, and thus the torque of the energy storage mechanism 6 acting on the actuating arm 52, can be increased and decreased.

The mechanical actuating drive 1.1 furthermore comprises at least one damping device 7 for damping a movement of the at least one actuating arm 52 of the actuating arm device 5. This damping device 7, together with the energy storage mechanism 6, forms the drive device A, with which a force can be exerted on the actuating arm device 5.

It is preferably provided for the damping device 7 that it
  is formed as a fluid damper and/or
  has at least one piston-cylinder unit and/or
  can be acted on by the at least one actuating arm 52 during a closing movement and/or
  can be acted on from the same side both during an opening movement O and during a closing movement S of the at least one actuating arm 52.

Figure 3A:
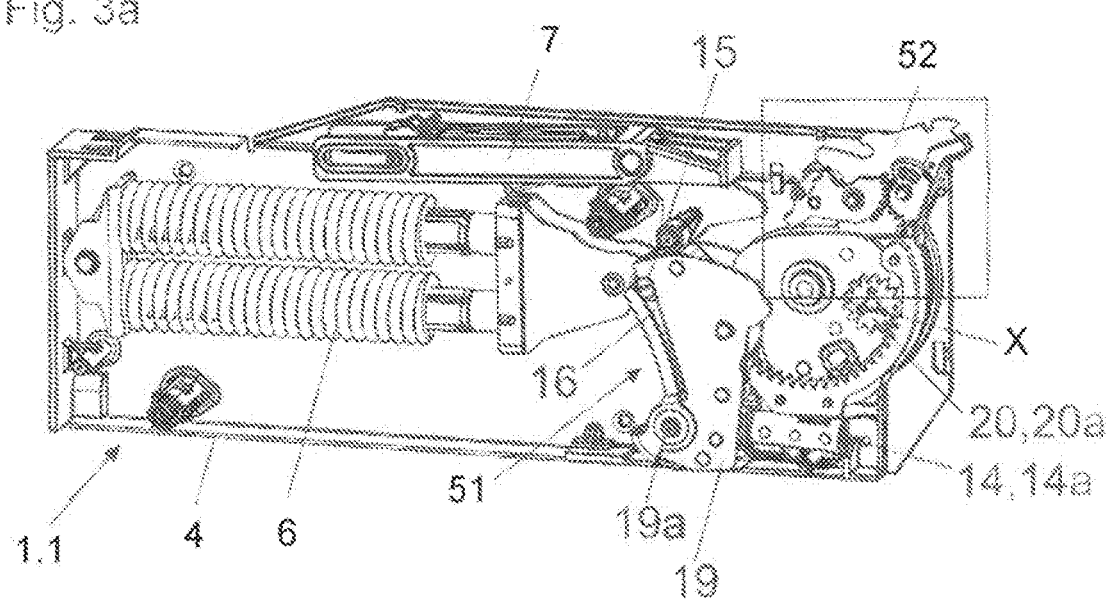

FIG. 3a shows the mechanical actuating drive 1.1 in a perspective view, wherein a force of the energy storage mechanism 6 can be transmitted to the at least one actuating arm 52 by the transmission mechanism 51 of the actuating arm device 5. The energy storage mechanism setting unit 14 can, for example, comprise a rotatable setting wheel 14a, wherein the point of application 15 of the energy storage mechanism 6 along the threaded spindle 16 can be set through a rotation of the setting wheel 14a and the torque acting on the actuating arm 52 can thus be set.

The mechanical actuating drive 1.1 can additionally have an installation safety device 20 for the empty actuating arm 52, thus on which a movable furniture part 2 has not yet been fitted, for limiting an opening speed of the empty actuating arm 52, wherein the installation safety device 20 prevents the empty actuating arm 52 from being unintentionally opened or swung out by a force of the energy storage mechanism 6. It is preferably provided that the installation safety device 20 comprises at least one centrifugal clutch 20a.

Figure 3B:
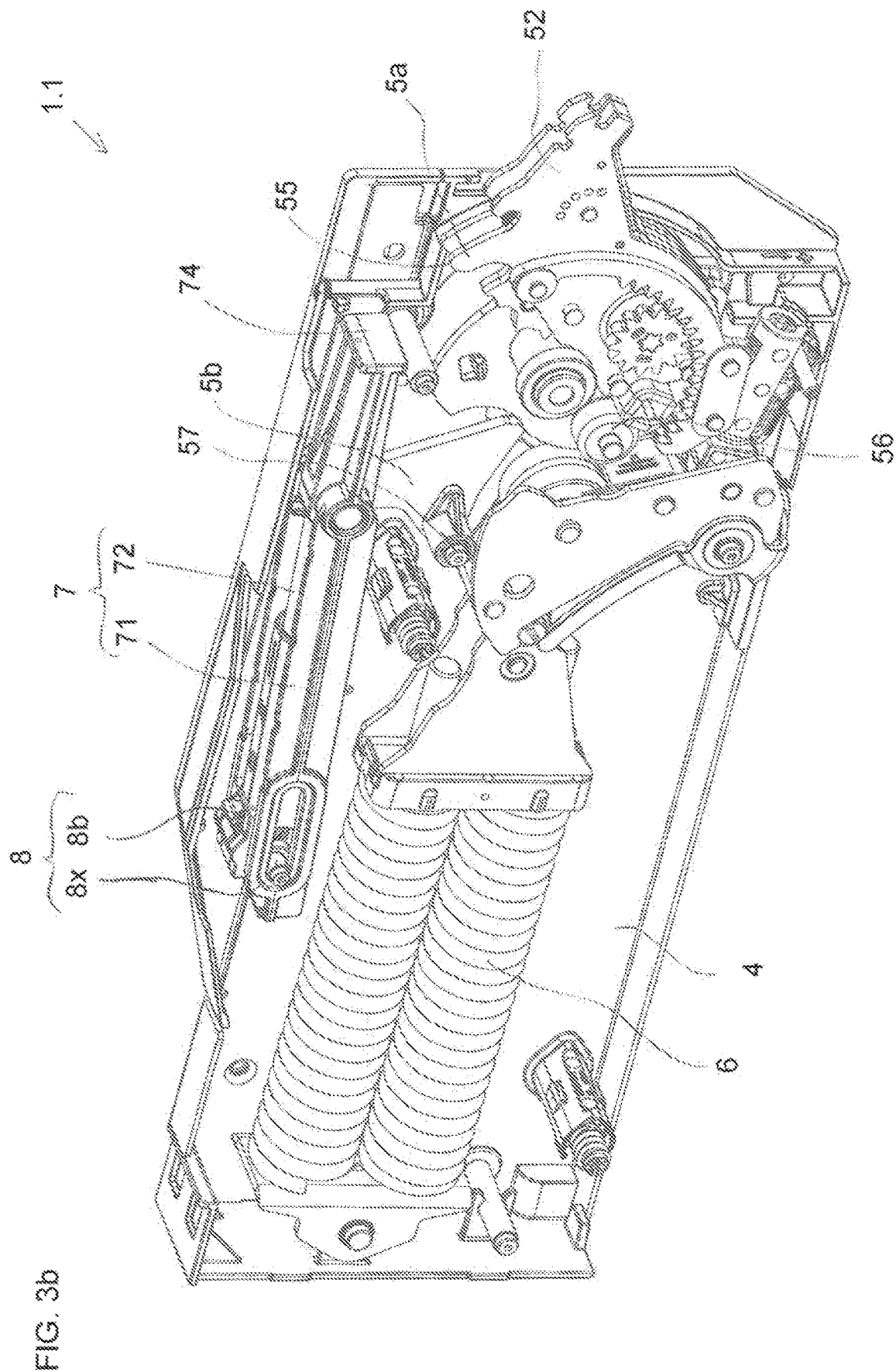

FIG. 3b shows a further (slightly offset) perspective view of the mechanical actuating drive 1.1. The entire damping device 7 can be easily recognized in this representation. This damping device 7 contains the damper housing 71 and the damper piston 72.

The damping device 7 is adjustable relative to the support 4 via the damper setting unit 8. The damper setting unit 8 contains the setting means 8a (in the form of a switch) and the setting axle pin 8x. The setting axle pin 8x is fixedly connected to the support 4.

In FIG. 3b the setting means 8a is pivoted towards the right, as a result of which the damping device 7 is located in a maximum right-hand position relative to the support 4.

In FIG. 3b it can be seen that a first damping transmission element 5a is formed on the actuating arm 52. This first damping transmission element 5a is formed in the shape of an extension, which faces the damping device 7. In the position represented in FIG. 3b, the stop 55 is (still) spaced apart from the stop counterpiece 74 formed on the damper housing 71.

A stop element 56 (in the form of a roller) is arranged on the actuating arm device 5. This stop element 56 is (still) spaced apart from the second damping transmission element 5b, which is mounted on the support 4, pivotable via the axle pin 57.

FIGS. 4a to 7b in each case show a vertical longitudinal section through the mechanical actuating drive 1.1 in different positions.

Figure 4A:
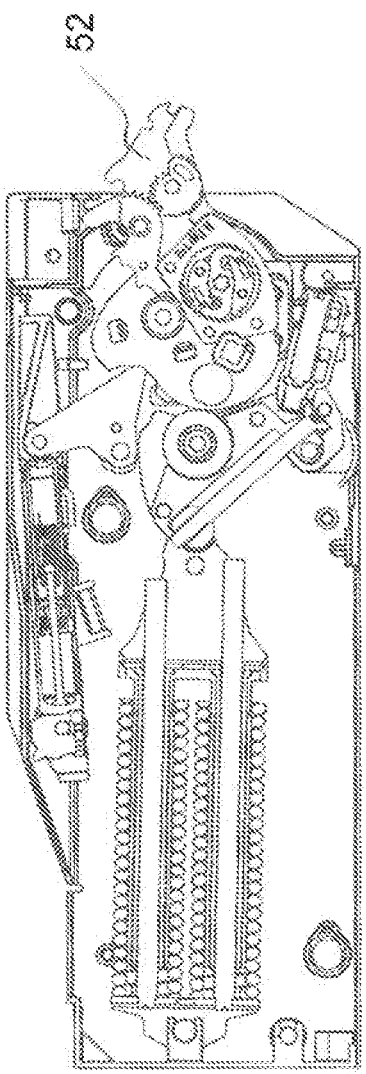
Figure 4B:
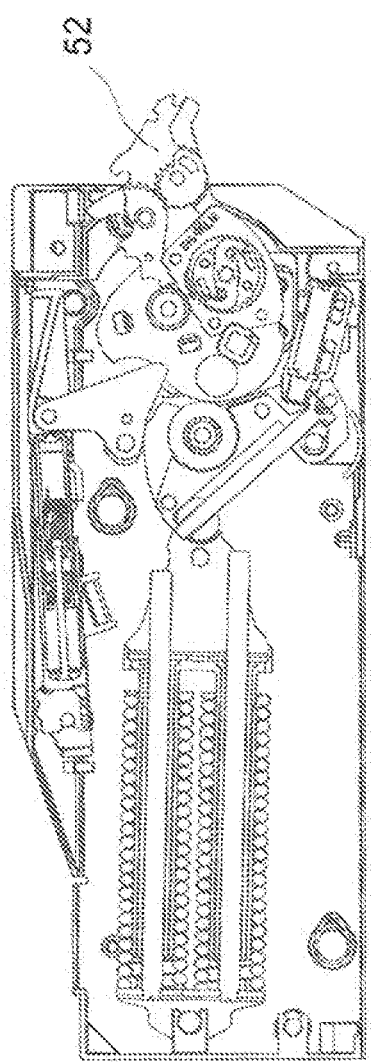

In FIGS. 4a and 4b the actuating arm device 5 is located in the same open position. This corresponds to an approximately half-open movable furniture part 2. The opening angle of the actuating arm 52 lies somewhere in the range between 55° and 80°.

However, FIGS. 4a and 4b differ in that the damping device 7 is located in different positions. In FIG. 4b the damping device 7 is located in its maximum right-hand position. As can be seen in the associated enlarged representation according to FIG. 5b, the setting means 8a is rotated towards the right about the setting axle pin 8x. As a result, a relatively broad region of the setting means 8*a* is located between the damper housing 71 and the setting axle pin 8*x*.

In contrast, in FIG. 4*a* and in the associated FIG. 5*a* the setting means 8*a* of the damper setting unit 8 is rotated 90° towards the left. As a result, a relatively narrow region of the setting means 8*a* is located between the damper housing 71 and the setting axle pin 8*x*. The damping device 7 is located in its maximum left-hand position.

In all positions according to FIGS. 4*a* to 5*b*, the damping device 7 is unloaded and thus pressure-relieved and in the fully extended position. The second damping transmission element 5*b* rests against the damping piston 72.

In the comparison between FIGS. 5*a* and 5*b* it can be recognized that, in addition to a translational displacement movement relative to the support 4, the damper housing 71 has also carried out a (slight) pivoting movement relative to the support 4.

In FIGS. 6*a* and 6*b*—starting from the previous FIGS. 4*a* to 5*b*—an opening movement O of the actuating arm device 5 has been carried out. As a result, the actuating arm 52 has been pivoted upwards. This opening movement O was carried out until the stop 55 of the first damping transmission element 5*a* contacted the stop counterpiece 74. In this position, the damping starting position D is reached in each case.

As the damping devices 7 are located in different maximum positions in FIGS. 6*a* and 6*b*, the actuating arm 52 adopts a different angular position in the case of the respectively given damping starting position D. Specifically, there is an opening angle of approximately 108° in FIG. 6*a*, whereas there is an opening angle of 100° in FIG. 6*b*.

If the opening movement O is continued from this respective damping starting position D, the damper piston 72 is pushed into the damper housing 71 via the stop counterpiece 74, as a result of which the damping device 7 takes effect. As soon as the damper piston 72 is completely retracted, the maximum open position OS is reached (not represented).

The portion of movement of the movable furniture part 2 upstream of the maximum open position OS is thus damped, wherein the damping starting position D is set differently via the damper setting unit 8. As a result, different opening angles can be set for the start of the damping movement.

The same principle also applies to the closing movement S.

In FIGS. 7*a* and 7*b*—starting from FIGS. 4*a* to 5*b*—a closing movement S of the actuating arm device 5 has been carried out. As a result, the actuating arm 52 has been pivoted downwards. This closing movement S was carried out until the stop element 56 contacted the second damping transmission element 5*b* through the rotational movement of the actuating arm 52 about the pivot pin X. In this position, the damping starting position D is reached in each case.

As the damping devices 7 are located in different maximum positions in FIGS. 7*a* and 7*b*, the actuating arm 52 adopts a different angular position in the case of the respectively given damping starting position D. Specifically, there is an opening angle of approximately 22° in FIG. 7*a*, whereas there is an opening angle of just 33° in FIG. 7*b*.

If the closing movement S is continued from this respective damping starting position D, the second damping transmission element 5*b* is rotated counterclockwise about the axle pin 57 via the stop element 56, as a result of which the damping transmission element 5*b* presses on the damper piston 72 via the stop 58 and pushes it into the damper housing 71, as a result of which the damping device 7 again takes effect. As soon as the damper piston 72 is completely retracted, the closed position SS is reached (not represented).

In FIG. 8, the entire piece of furniture 100 is represented in a perspective view. In this view, the power supply unit 21, via which an electric motor-powered furniture drive 1.2 (not recognizable here) can be supplied with power, can be recognized.

In FIG. 8, on both sides of the furniture carcass 3 there is also a detecting device 22 for detecting an overpressure movement and/or for triggering a closing movement S. If the movable furniture part 2 is located in the closed position SS and a user presses on the movable furniture part 2, this is detected by the detecting device 22, whereupon an opening movement O of the furniture drive system 1 is initiated via the control device 44 and the electric motor-powered furniture drive 1.2. In the case of a movable furniture part 2 that is open as in FIG. 8, a user can press directly on one of the detecting devices 22, whereupon a closing movement S of the furniture drive system 1 is initiated via the control device 44 and the electric motor-powered furniture drive 1.2.

Figure 9:
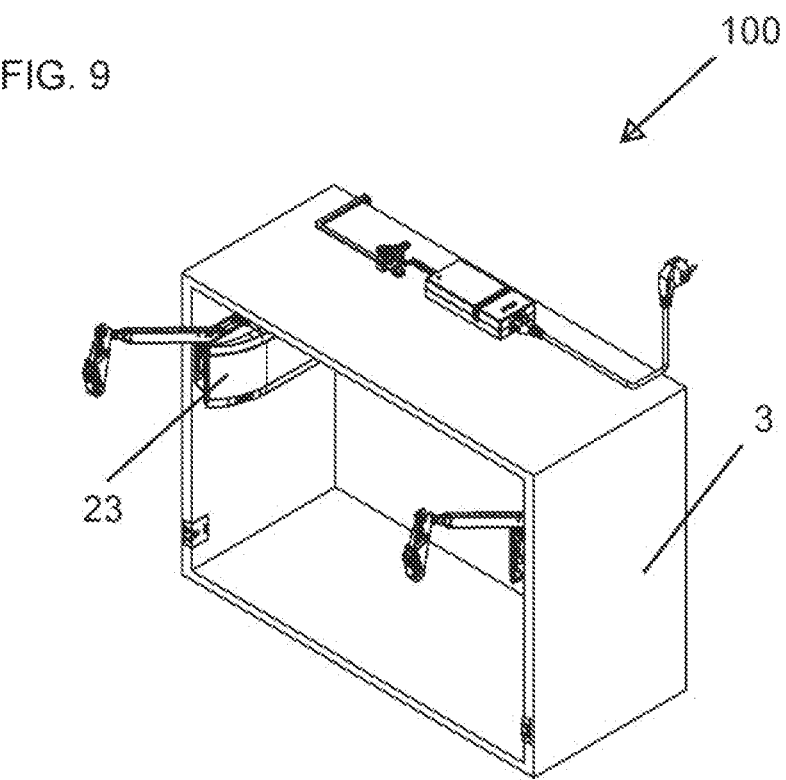
FIG. 9, is a perspective view of the furniture carcass with furniture drive systems arranged on both sides.

In FIG. 9, only the furniture carcass 3 together with the furniture drive systems 1 arranged on both sides of the furniture carcass 3 is represented in a perspective view. The protective faceplate 23 of the electric motor-powered furniture drive 1.2 can be easily recognized.

Figure 10:
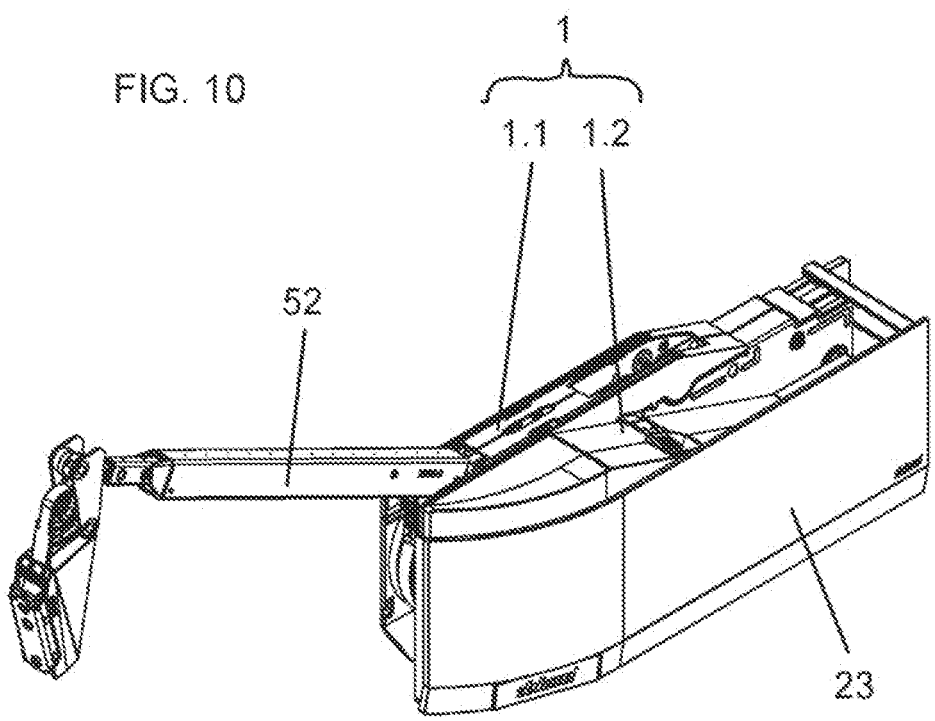
FIG. 10, is a perspective view of the furniture drive system with a protective faceplate.

FIG. 10 shows the furniture drive system 1, which contains the mechanical actuating drive 1.1 and the electric motor-powered furniture drive 1.2, in a perspective view. These two units 1.1 and 1.2 are releasably connected to each other laterally via their respective housing. The entire furniture drive system 1 can be fastened to a furniture carcass 3 via the support 4. The electric motor-powered furniture drive 1.2 has the protective faceplate 23.

Figure 11:
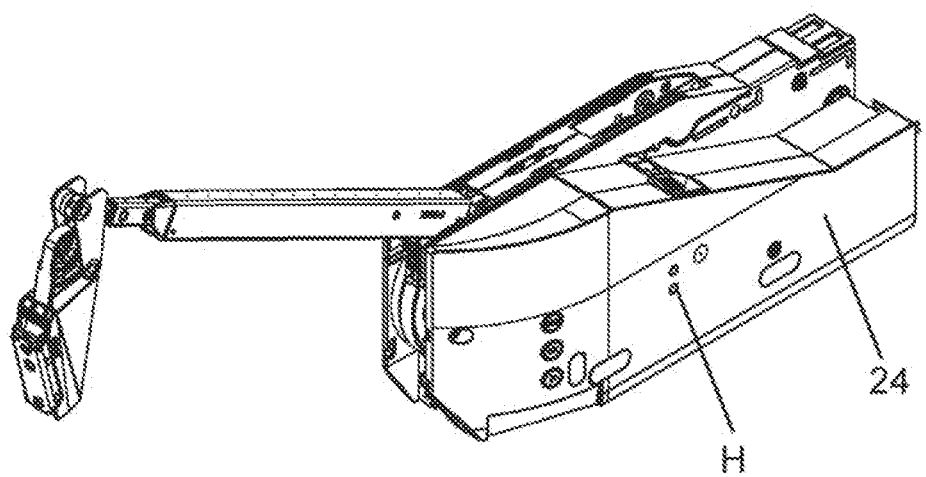
FIG. 11, is a perspective view of the furniture drive system without protective faceplate, with a view onto the cover.

In FIG. 11, the furniture drive system 1 is again represented in perspective, wherein however the protective faceplate 23 has been omitted, as a result of which the view onto the cover 24 also forming the housing of the electric motor-powered furniture drive 1.2 is unobstructed. A visual indication signal H can be displayed on this cover 24 of the furniture drive system 1.

Figure 12:
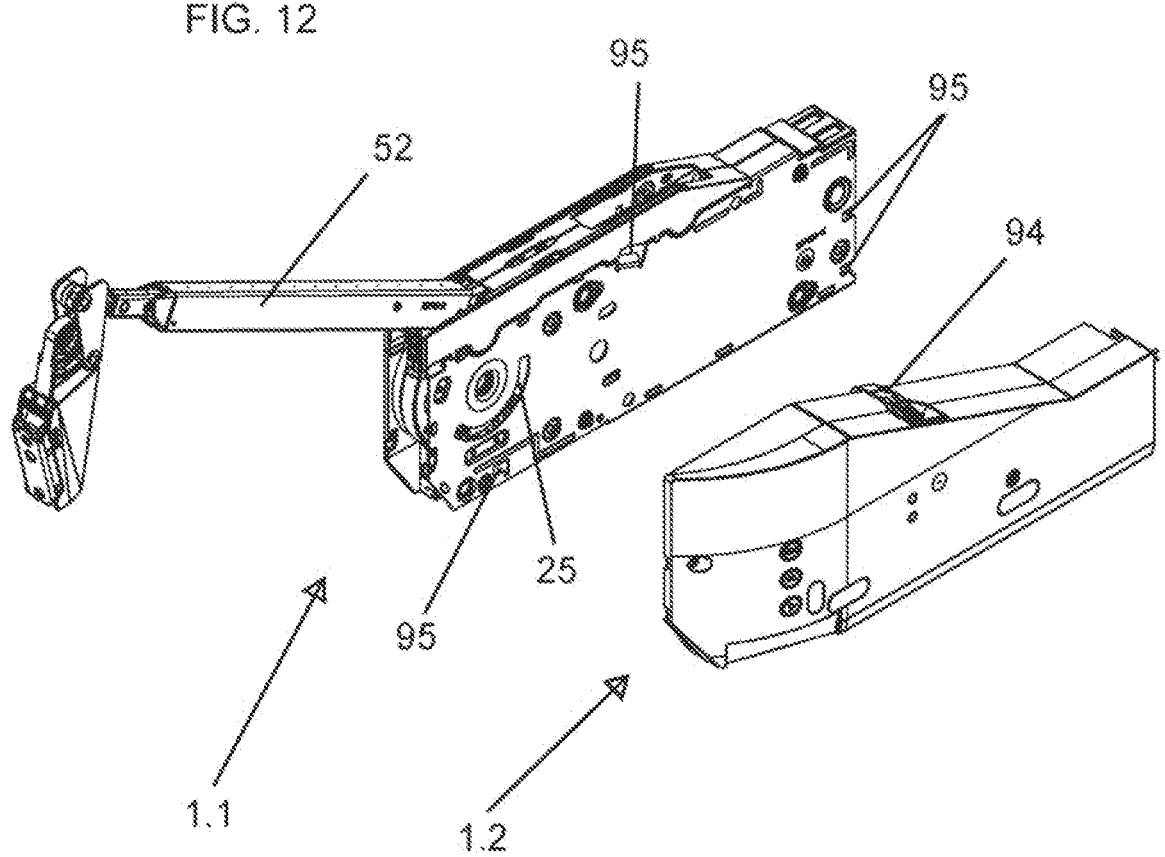
FIG. 12, is a perspective view of the mechanical actuator unit and the electrical drive unit.

In FIG. 12, the electric motor-powered furniture drive 1.2 and the mechanical actuating drive 1.1 are represented separately. In the housing of the mechanical actuating drive 1.1, a (curved) engagement opening 25 is formed, via which an engagement in the actuator 58 of the actuating arm device 5 is possible.

Figure 13:
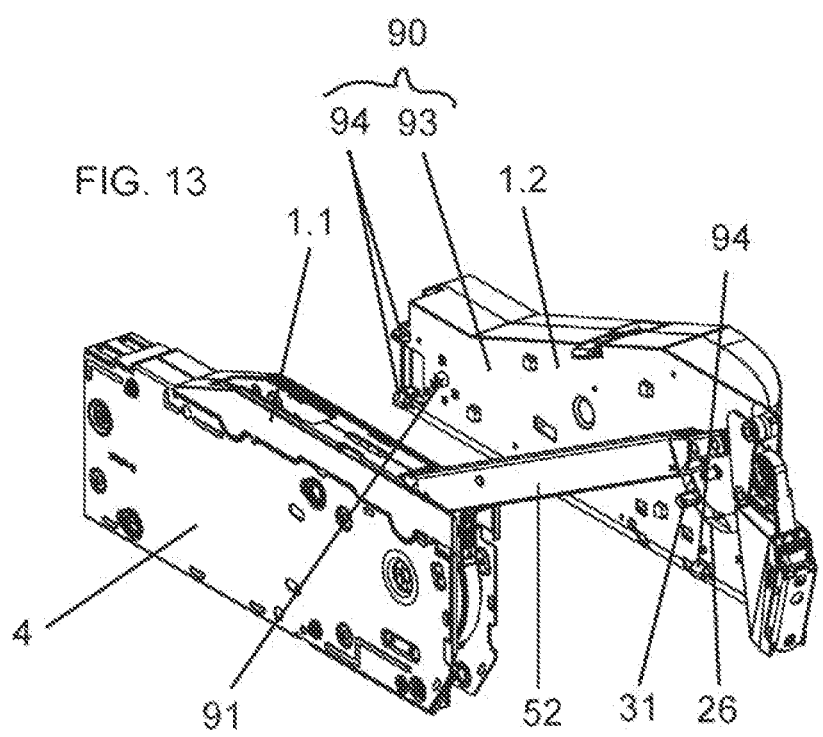
FIG. 13 is a different perspective from FIG. 12, FIG. 14, is a perspective view of the electrical drive unit.

In line with this, in FIG. 13, which shows a different angle of view onto the furniture drive system 1, the driver 31 protruding out of a (curved) exit opening 26 in the housing of the electric motor-powered furniture drive 1.2 can be seen.

This side of the electric motor-powered furniture drive 1.2 facing the mechanical actuating drive 1.1 forms the interface 90 via which the two drives 1.1 and 1.2 can be releasably connected to each other. A part of the identification device 91—specifically the mechanical tracer element 96—protrudes from this interface 90, which is oriented along a vertical plane, in the direction of the mechanical actuating drive 1.1.

As can be recognized in FIG. 13, the interface 90 comprises the connecting plate 93 (also forming the housing) and several connecting elements 94.

The connecting counterpieces 95 corresponding to the connecting elements 94 can be seen in FIG. 12. These connecting counterpieces 95 are formed in or on the housing of the mechanical actuating drive 1.1. The connecting elements 94 can be releasably connected to the connecting counterpieces 95 by snapping on, pushing on, clipping on or similar.

Figure 14:
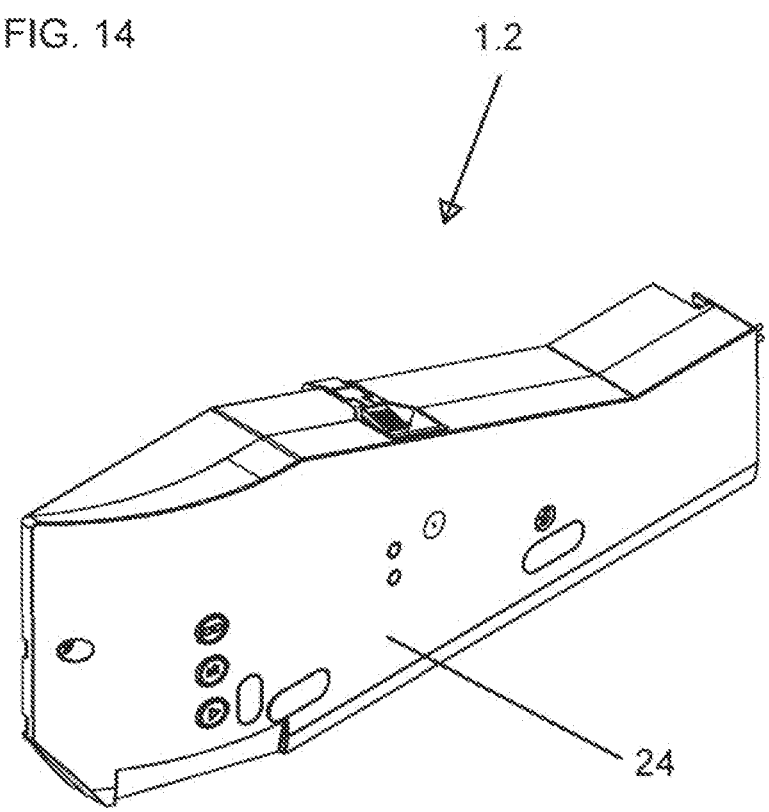

In FIG. 14, only the housing of the electric motor-powered furniture drive 1.2 together with the cover 24 is represented.

Figure 15:
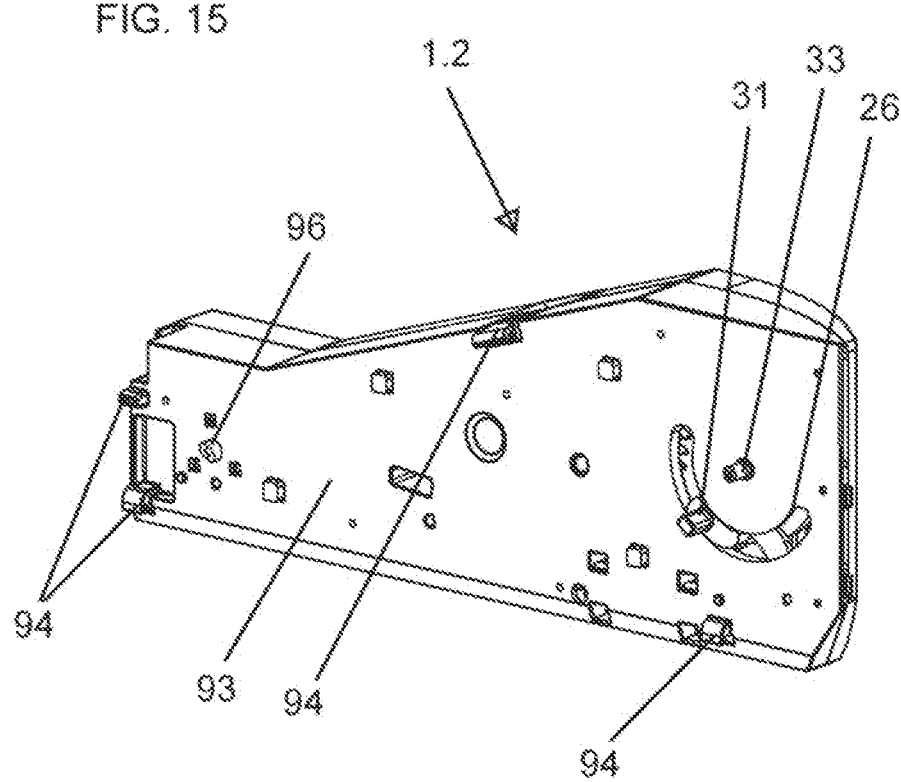
FIG. 15 is a different perspective from FIG. 14, FIG. 16, are details of the electrical drive unit with all the relevant component parts.

FIG. 15 shows the electric motor-powered furniture drive 1.2 in a view onto the side facing the mechanical actuating drive 1.1. In the embodiment represented, the driver 31 is formed as a peg, which is mounted displaceable to a limited extent in a guide contour (exit opening 26), which [is] formed in the housing. The driver 31 projects from the housing on the side which faces the mechanical actuating drive 1.1.

In FIG. 15, the connecting plate 93 and the connecting elements 94 as well as the mechanical tracer element 96 of the identification device 91 are again particularly clearly visible.

Figure 16:
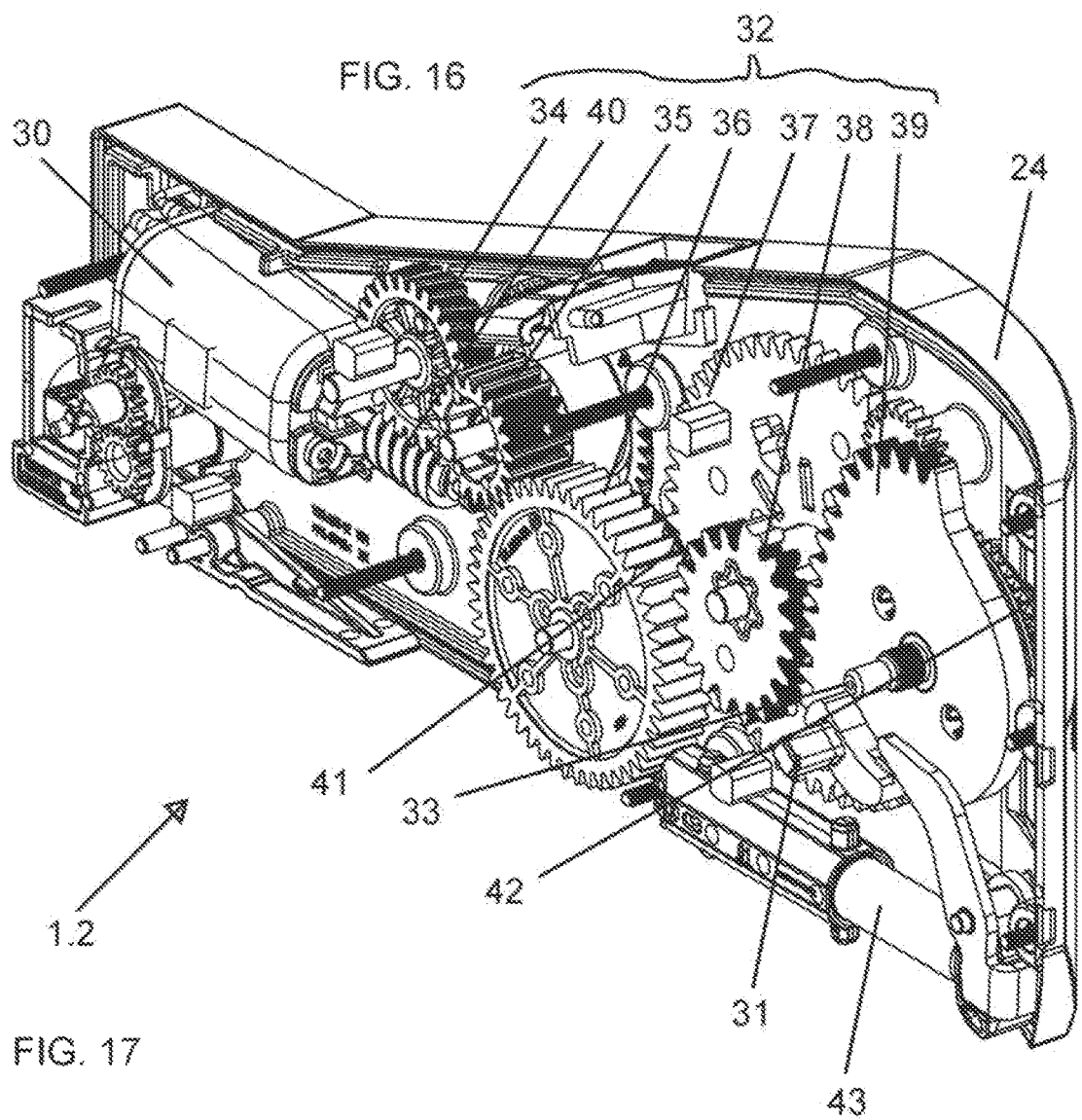

FIG. 16 shows the electric motor-powered actuating drive 1.2 of the furniture drive system 1 in a perspective detailed representation, wherein the part of the cover 24 pointing in the direction of the mechanical actuating drive 1.2 has been omitted.

The electric motor-powered furniture drive 1.2 comprises an electric motor 30 for the electric motor-powered support of the movement of the movable furniture part 2, which can be fastened to the actuating arm 52. Furthermore, the electric motor-powered furniture drive 1.2 comprises a driver 31, which can be driven (indirectly) by the electric motor 30, for transmitting a torque of the electric motor 30 to the mechanical actuating drive 1.2 or to the actuating arm 52 and a furniture part 2 that may possibly be connected to it.

The mechanical actuating drive 1.1 and the electric motor-powered furniture drive 1.2 can be connected to each other releasably. As a result, the electric motor-powered furniture drive 1.2 can be connected to the mechanical actuating drive 1.1 or separated from it in a simple manner.

The components of the electric motor-powered furniture drive 1.2 can be arranged in a housing comprising the cover 24, as represented. The housing rests against the mechanical actuating drive 1.2 at least in regions and, in the embodiment represented, separates the mechanical actuating drive 1.1 from the assembly of the electric motor-powered furniture drive 1.2.

In place of a housing, an installation plate which does not enclose the assembly of the electric motor-powered furniture drive 1.2 but delimits and supports it only on one side can also be used, for example.

Between the electric motor 30 and the driver 31, a gear mechanism 32 is provided, which converts a torque of the electric motor 30 into a pivoting movement of the driver 31 about a pivot pin 33. The gear mechanism 32 comprises several gear stages (worm gear 40 and cogwheels 34, 35, 36, 37, 38 and 39). The gear stages 34 to 40 are in engagement with each other in each case via gear-tooth systems. Furthermore, the gear mechanism 32 comprises a freewheel clutch 41, which is integrated in the cogwheel 36, and an overload clutch 42, which is integrated in the cogwheel 39.

The electric motor-powered furniture drive 1.2 also has its own damping device 43 for damping the movement of the driver 31 about the pivot pin 33.

Returning to FIG. 1, the following may be described in more detail.

The electric motor-powered furniture drive 1.2 contains an identification device 91. This in turn contains a sensor 92 and a mechanical tracer element 96, which [is] arranged in the region of the interface 90 with the mechanical actuating drive 1.1. The mechanical actuating drive 1.1 in turn contains a tracer element counterpiece 97 corresponding to the mechanical tracer element 96 (indicated schematically).

The configuration K of the mechanical actuating drive 1.1 can be identified when the electric motor-powered furniture drive 1.2 is connected to the mechanical actuating drive 1.1. Specifically, the mechanical tracer element 96 contacts the tracer element counterpiece 97 during the connection. This tracer element counterpiece 97 represents a parameter P of the mechanical actuating drive 1.1. Through the contact, the mechanical tracer element 96 is moved, wherein the position of the tracer element 96 can be detected by the sensor 92.

The parameter P of the mechanical actuating drive 1.1 detected by the sensor 92 is transmitted to the control device 44. A data set F is stored in the control device 44. This data set F contains—as represented by way of example in FIG. 1—several configurations K of the mechanical actuating drive 1.1. Specifically, there are eight different configurations K, which are made up of the three types of furniture flap HF, HS and HL and the three power factors L of the energy storage mechanism 6.

Then, a comparison of the parameter P detected by the sensor 92 with the data sets F is effected by the identification device 91 via the control device 44 and the current configuration $K_{akt}$ of the mechanical actuating drive 1.1 is identified.

Via the control device 44, control signals I can then in turn be output to the electric motor 30 depending on the current configuration $K_{akt}$ of the mechanical actuating drive 1.1 identified via the identification device 91.

Figure 17:
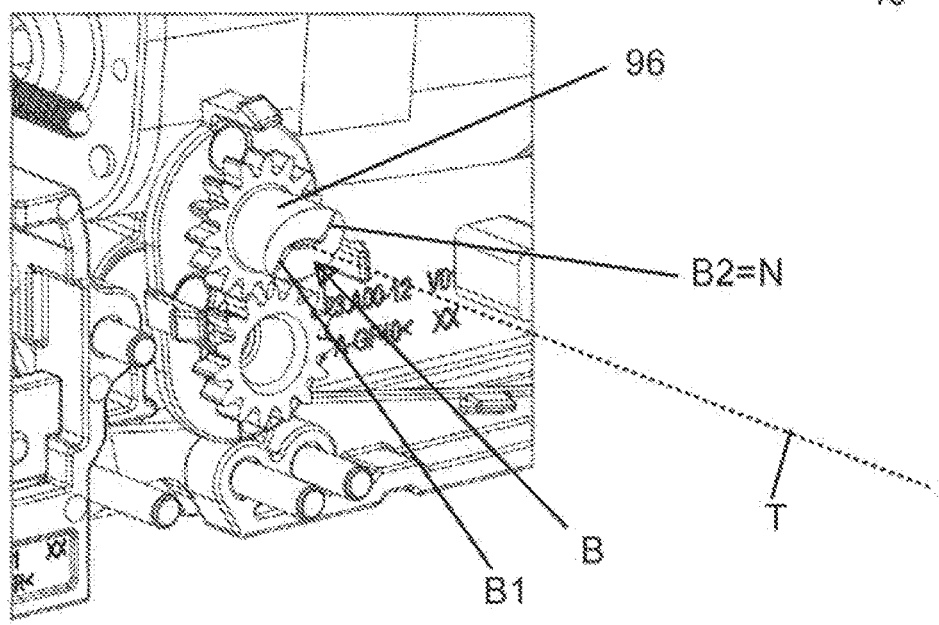
FIG. 17, is a perspective view of a detail from FIG. 16.

Details relating to the identification device 91 are represented in FIG. 17. Specifically, the tracer element 96 that is rotatably mounted on the housing (preferably on the connecting plate 93 of the interface 90 not represented here) can be seen in FIG. 17. This tracer element 96 is rotatable about an axis of rotation T—preferably oriented at right angles to the vertical plane—wherein the rotatably mounted tracer element 96 has a tracing surface B that faces the mechanical actuating drive 1.1 and is inclined relative to the axis of rotation.

It can be easily recognized in FIG. 17 that the inclined tracing surface B has a tracing line B1 closest to the interface, lying on the tracing surface B and leading radially away from the axis of rotation T, and a tracing line B2 furthest from the interface, lying on the tracing surface B and leading radially away from the axis of rotation T. The tracing line B2 furthest from the interface also forms a tracing lug N that can be moved into the tracer element counterpiece 97.

In the embodiment variant according to FIG. 17, the rotatable mechanical tracer device is connected to a sensor 92 (not represented here) via two cogwheels. Other variants of movement transmission are also possible.

Figure 18:
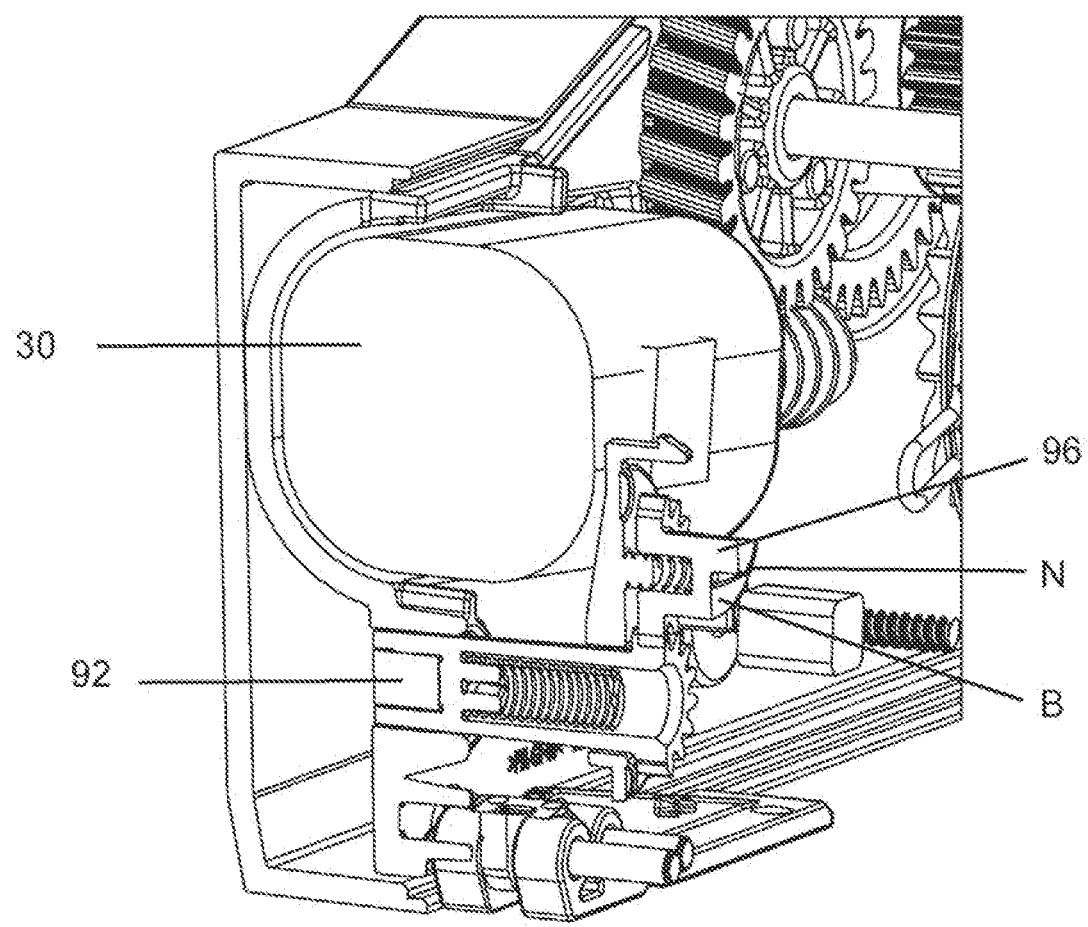
FIG. 18 is a perspective section view through the region of the electric motor.

A section through the electric motor-powered furniture drive 1.2 in the region of the electric motor 30 and through the mechanical tracer element 96 is represented in FIG. 18, wherein the tracing surface B and the tracing lug N are also easily recognizable. The mechanical tracer element 96 is mounted resiliently along the axis of rotation T. The rotational movement or rotational position of this mechanical tracer element 96 can be detected via the sensor 92.

Figure 19:
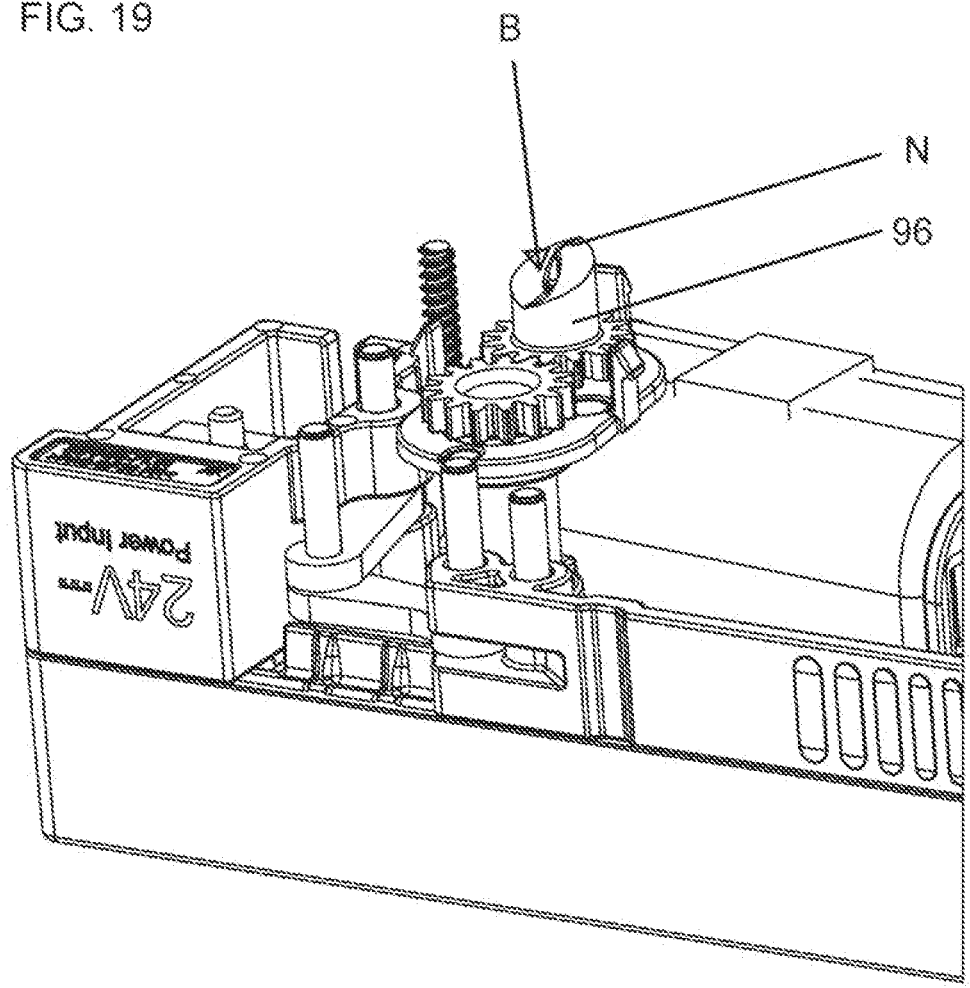
FIG. 19, is a perspective view of the region of the mechanical tracer element.

The perspective representation according to FIG. 19 allows the inclined tracing surface B together with tracing lug N and the shape of the mechanical tracer element 96 to be recognized particularly easily.

Figure 20:
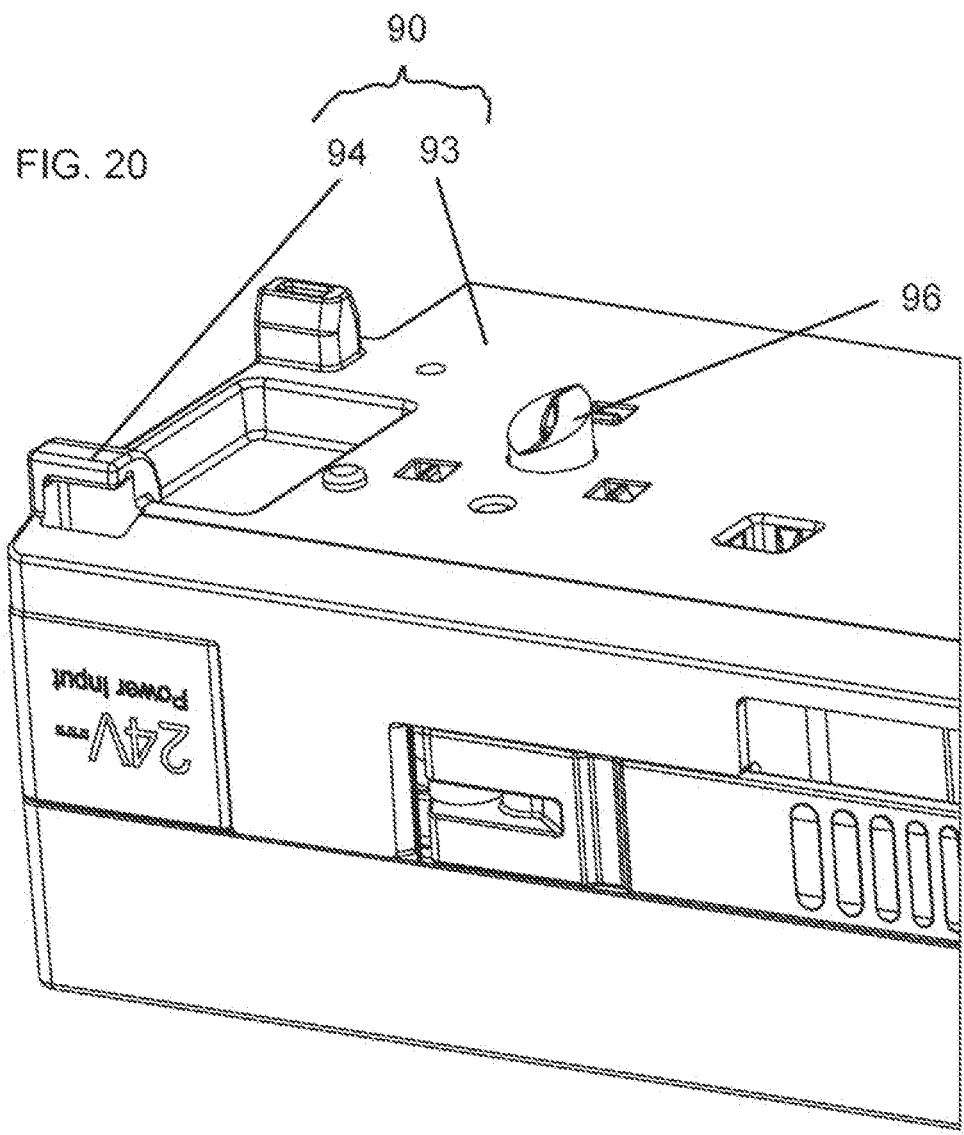
FIG. 20, is a perspective view of the interface with protruding tracer element.

In FIG. 20—in contrast to FIG. 19—the housing of the electric motor-powered furniture drive 1.2 is also represented. The mechanical tracer element 96 protrudes through this housing through an opening in the connecting plate 93.

Figure 21:
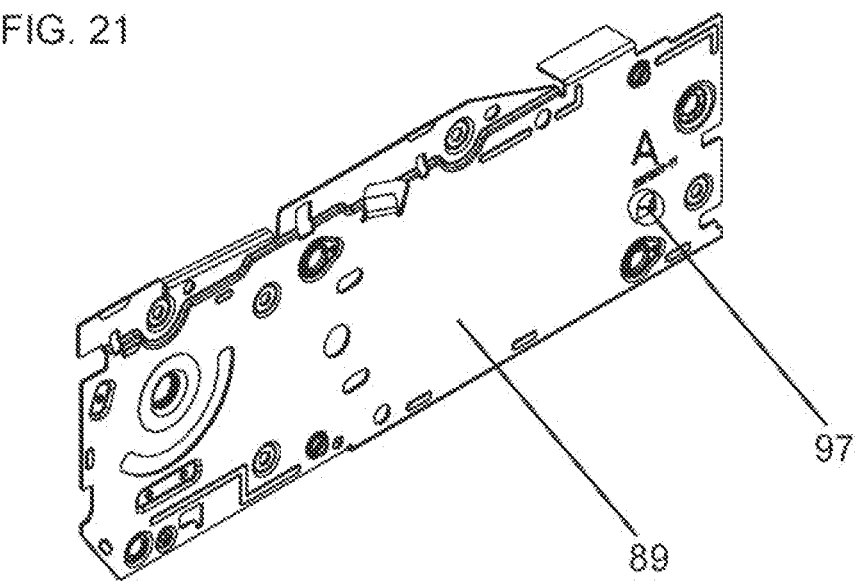
FIG. 21, is a perspective view of the housing part with tracer element counterpiece.

FIG. 21 shows, in perspective, the housing part 89 of the mechanical actuating drive 1.1 facing the interface 90. The tracer element counterpiece 97 is formed in this housing part 89.

Figure 22:
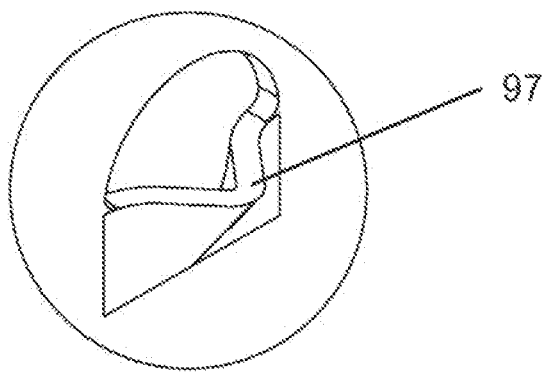
FIG. 22 shows the tracer element counterpiece in detail.

This tracer element counterpiece 97 is represented in detail in FIG. 22, wherein it is implemented as a stamping formed in the sheet metal of the housing.

Figure 24:
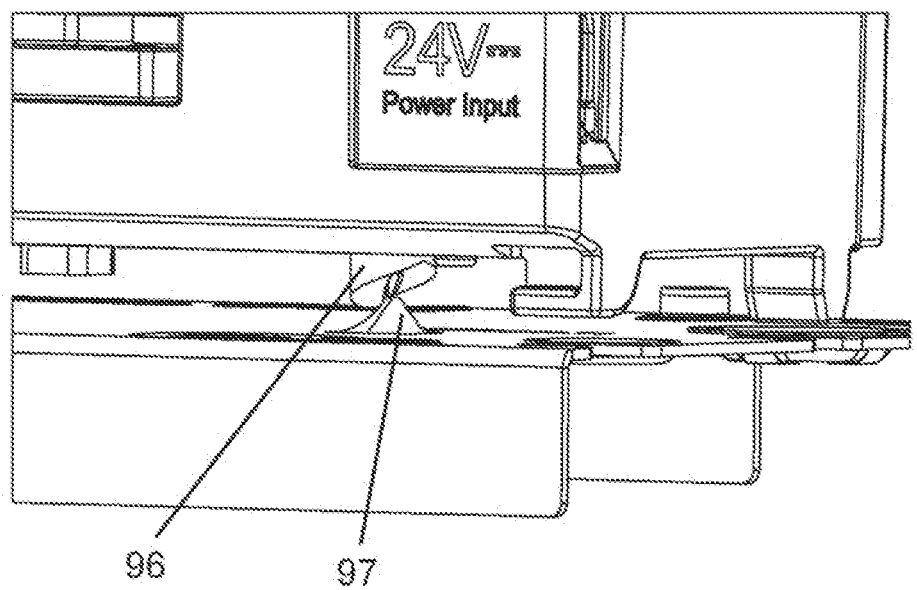
Figure 25:
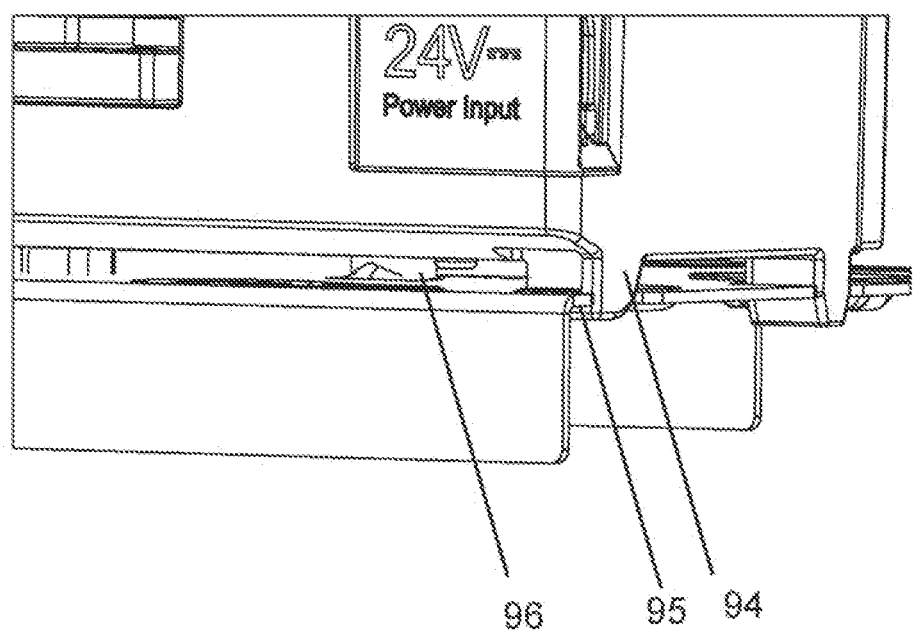

FIG. 23 shows the tracer element counterpiece 97 and the opposing, still spaced apart, mechanical tracer element 96 before the connection. In FIG. 24 there is still a slight spacing, whereas in FIG. 25 the two parts 96 and 97 have connected to each other, wherein the tracer element 96 has rotated about the axis of rotation T in dependence on the shape of the tracer element counterpiece 97. The connecting elements 94 and the connecting counterpieces 95 are likewise connected to each other.

Figure 26:
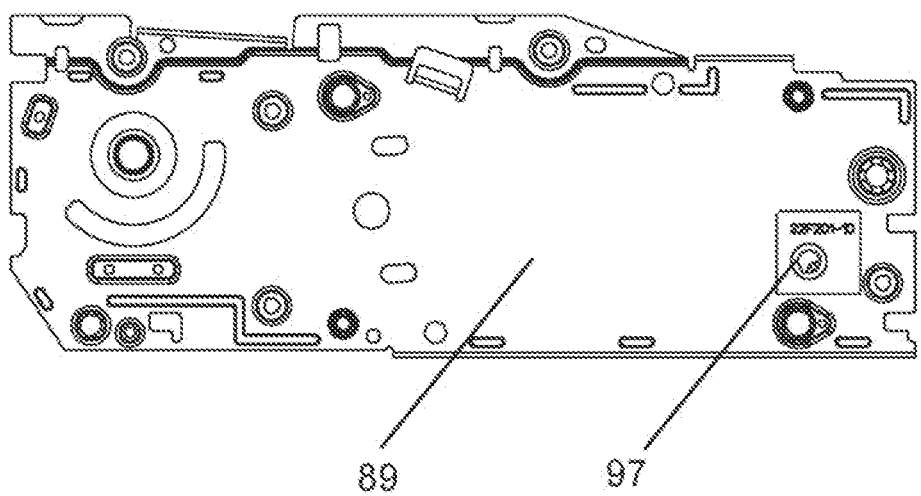
FIG. 26 is a view of the housing part.

FIG. 26 shows the housing part 89 in a top view together with the stamped tracer element counterpiece 97.

Figure 27:
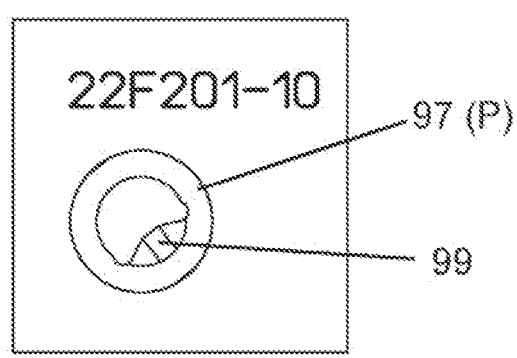
FIG. 27 shows the tracer element counterpiece from FIG. 26 in detail.

A detail from FIG. 26 is represented in FIG. 27. The tracer element counterpiece 97 has a recess, into which the tracing lug N can penetrate during the connection. The tracer element counterpiece 97 has a protrusion 99, which defines or represents the parameter P of the mechanical actuating drive 1.1 and juts into the recess. This means that this tracer element counterpiece 97 for the later identification during the connection to the electric motor-powered furniture drive 1.2 is already produced or stamped during the production of the housing part 89 of the mechanical actuating drive 1.1.

Figure 28:
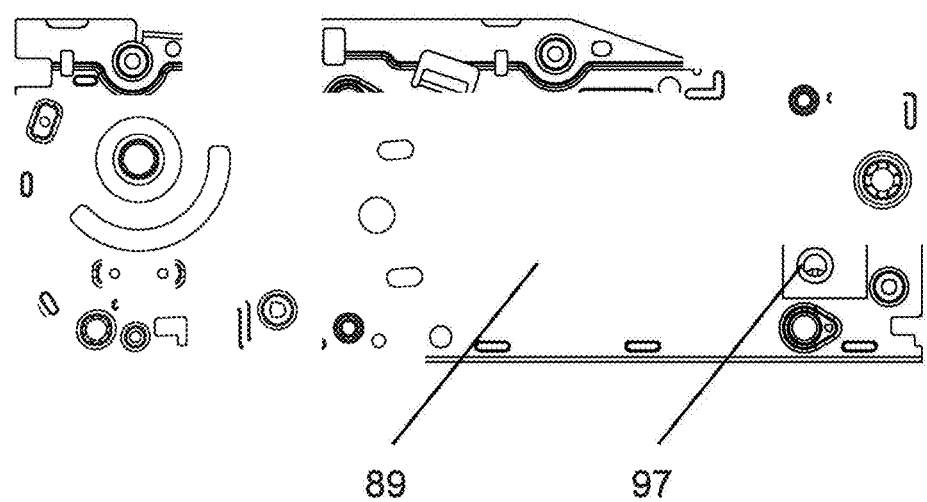
FIG. 28 is a view of the housing part.
Figure 29:
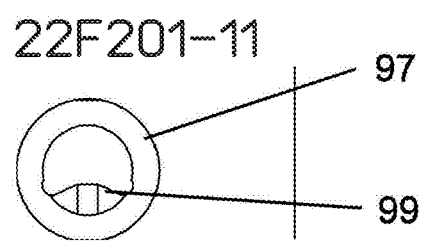
FIG. 29 shows the tracer element counterpiece from FIG. 28, oriented offset, in detail.

In FIGS. 28 and 29, the protrusion 99 is formed offset. This tracer element counterpiece 97 thus represents a different parameter P.

Figure 30:
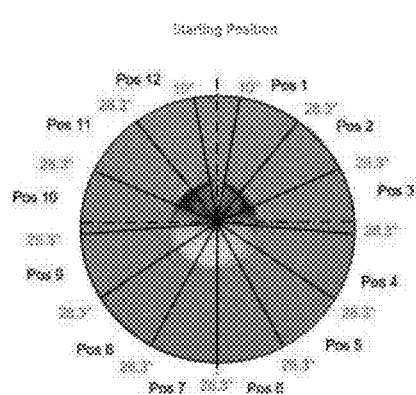
FIG. 30 shows possible different angular positions, which in each case correspond to a particular configuration.

The type recognition can be explained with reference to FIG. 30 as well. Starting from a starting position (vertically at the top), a dead region of 10° is located on both sides of this starting line. Then—like a clock—there are twelve regions in each case of approximately 28.3° (=340°). Each of these regions corresponds to a parameter P, from which one configuration K can be identified in turn. Thus, depending on how the protrusion 99 is stamped, the configuration K can be recognized via the identification device 91.

In other words, the mechanical tracer element 96 orients itself on the stamping in the sheet metal of the housing (tracer element counterpiece 97). The turning of the tracer element 96 is detected and evaluated by the electronics of the control device 44.

In FIGS. 31 to 42, a further embodiment with an alternative design of the mechanical tracer element 96 and of the tracer element counterpiece 97 is represented.

Figure 31:
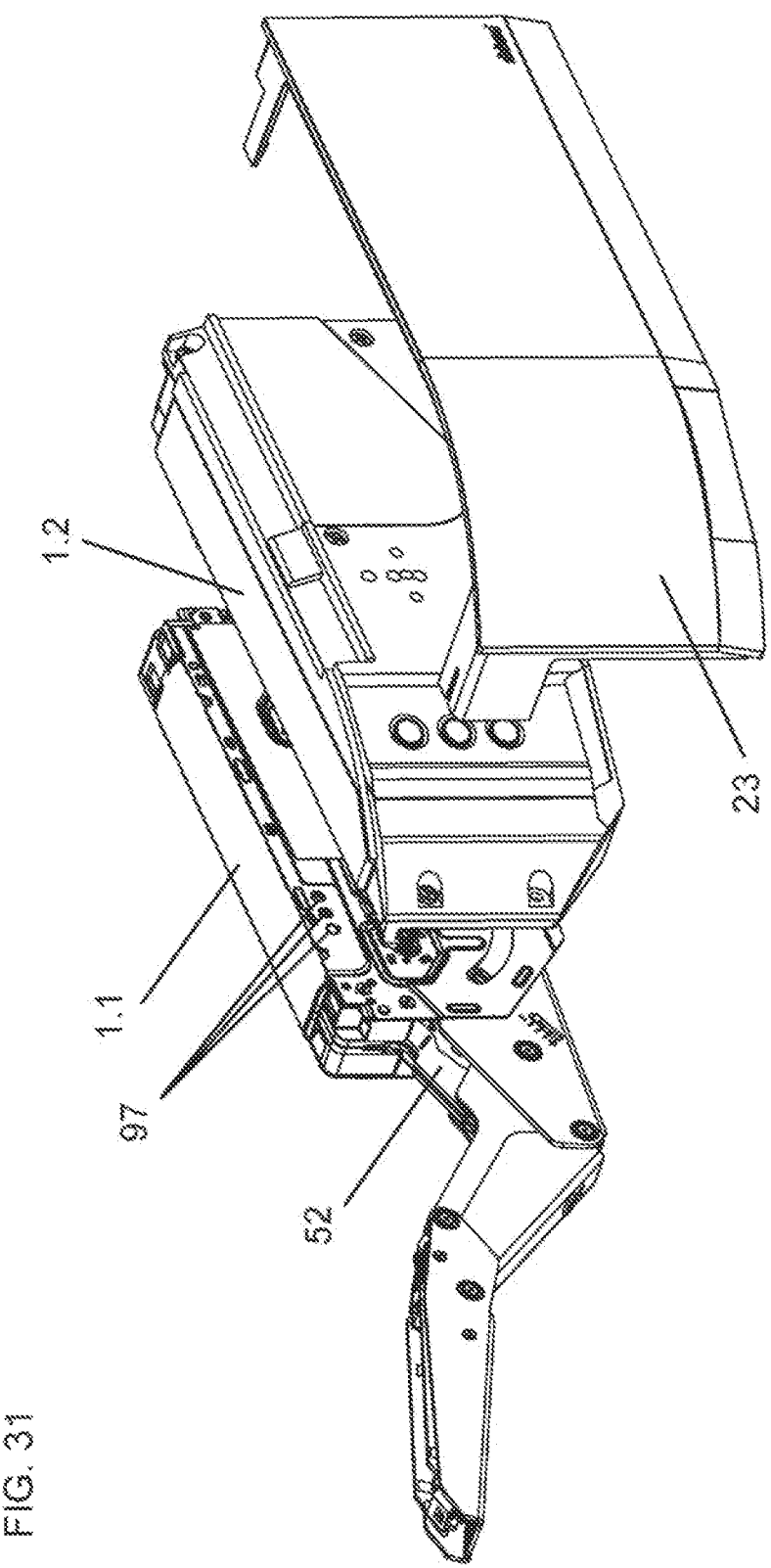

In FIG. 31, a furniture drive system comprising a mechanical actuating drive 1.1 and an electric motor-powered furniture drive 1.2 is [represented] in perspective. The protective faceplate 23 is additionally represented. The tracer element counterpiece 97 is formed on the housing part 89 of the mechanical actuating drive 1.1 in the form of three recesses.

FIG. 32 is identical to FIG. 31, wherein the region of the tracer element counterpiece 97 is circled.

This circled region is represented enlarged in FIG. 33. It can thus be recognized that, in this case, the two right-hand recesses of the tracer element counterpiece 97 are empty, whereas the left-hand recess is filled. The three recesses thus form a type of code, which reflects the parameter P of the mechanical actuating drive 1.1.

Figure 34:
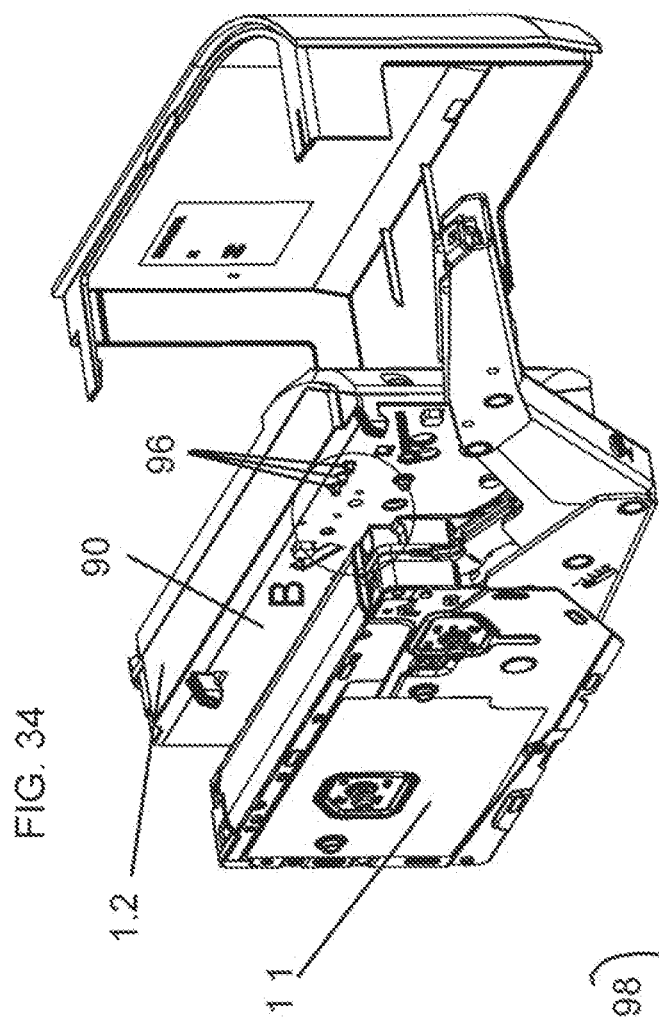

In FIG. 34, the furniture drive system 1 is represented from a different perspective, with the result that the view onto the interface 90 of the electric motor-powered furniture drive 1.2 is also partially unobstructed. The mechanical tracer element 96 can already be recognized in the circled region.

Figure 35:
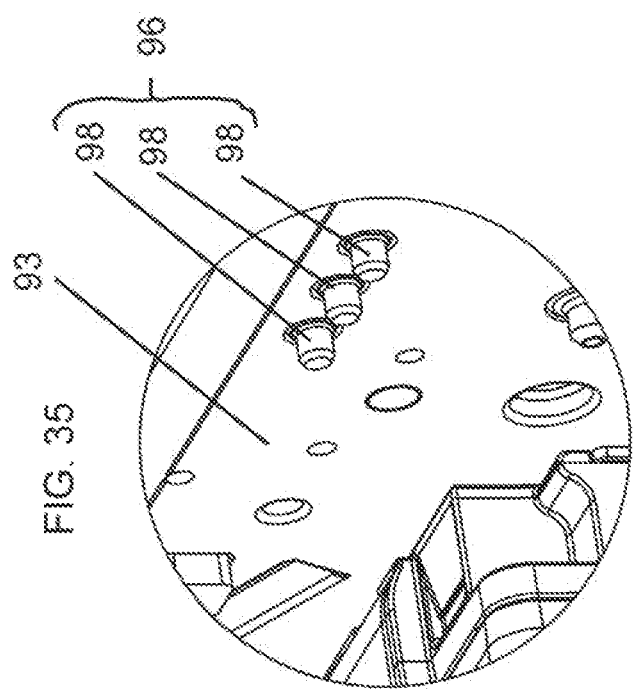

FIG. 35 shows this circled region enlarged. It can be recognized that this mechanical tracer element 96 has three displaceably mounted tracing pins 98, which protrude through the connecting plate 93.

Figure 36:
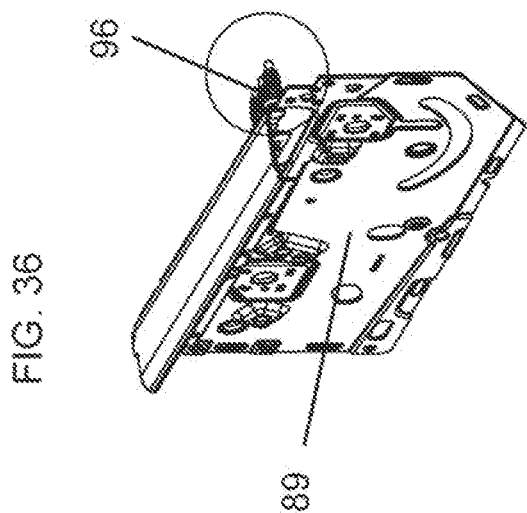

FIG. 36 shows, in perspective, the housing part 89 of the mechanical actuating drive 1.1, the rest is blanked out. Of the electric motor-powered furniture drive 1.2, only the mechanical tracer element 96 is represented at all in the circled region, the remaining component parts of the electric motor-powered furniture drive 1.2 are blanked out for better clarity.

Figure 37:
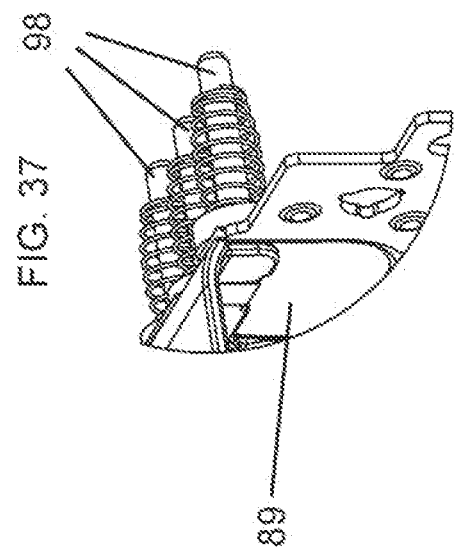
Figure 38:
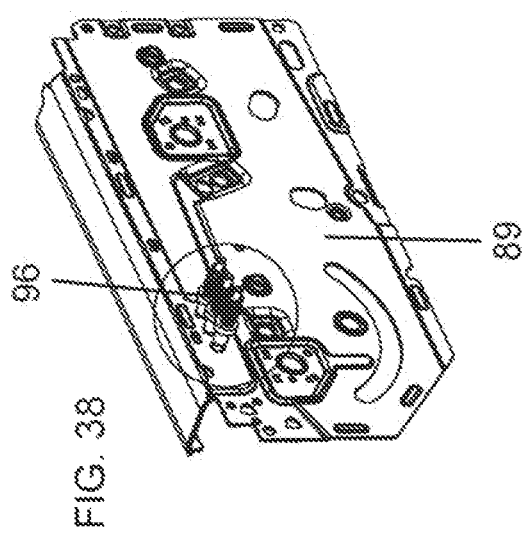

FIG. 37 shows the circled region from FIG. 36 enlarged. The individual tracing pins 98 are each surrounded by a compression spring 88 and preloaded in the direction of the housing part 89 via this respective compression spring 88.

FIG. 38 again shows the housing part 89 together with mechanical tracing element 96 from a different perspective.

Figure 39:
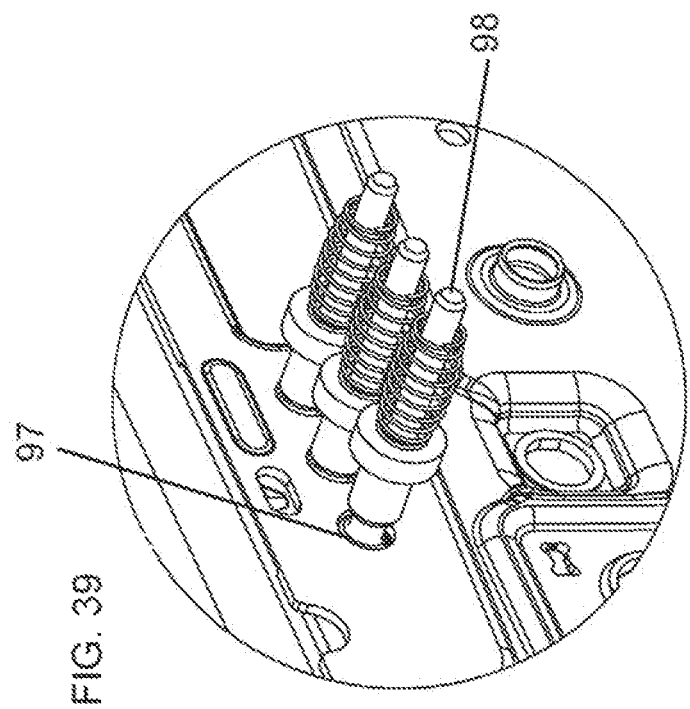

In the enlarged representation according to FIG. 39 it can be recognized that the left-hand recess of the tracer element counterpiece 97 is filled, with the result that the tracing pin 98 of the mechanical tracer element 96 is waiting. In contrast, the two right-hand tracing pins 98 extend into the two open recesses of the tracer element counterpiece 97.

These different positions of the tracing pins 98 can be detected by a sensor 92.

Figure 40:
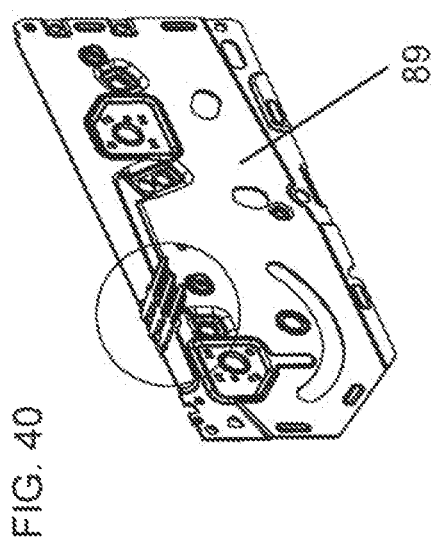

In FIG. 40, the housing part 89 is represented in perspective with the tracing pins represented half cut open.

Figure 41:
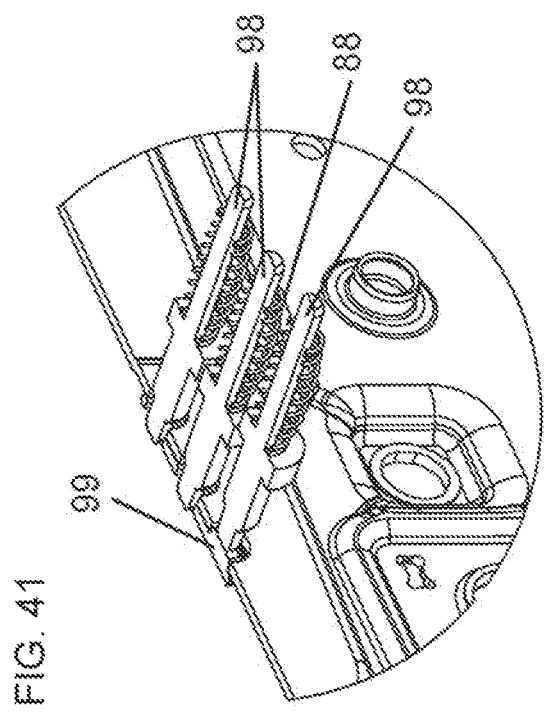

The circled region from FIG. 40 is represented enlarged in FIG. 41. It can be seen that the two right-hand tracing pins 98 penetrate into the recesses of the tracer element counterpiece 98, whereas the left-hand tracing pin 98 waits against the protrusion 99 filling the recess.

Figure 42:
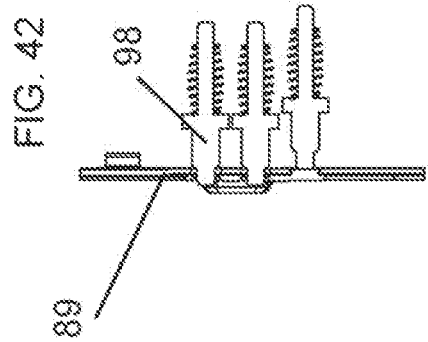

In FIG. 42, a top view onto the three tracing pins 98 is represented, wherein it can be easily recognized that two tracing pins 98 penetrate through the housing part 89 in the region of the recesses of the tracer element counterpiece 97.

Overall, in the case of this embodiment variant with three tracing pins 98 represented in FIGS. 31 to 42, there are nine possible variants for parameter P of the mechanical actuating drive 1.1—depending on how many and which recesses of the tracer element counterpiece 97 are filled.

If, for example, the mechanical tracer element 96 has only two displaceably mounted tracing pins 98 (not represented), only a maximum of four parameters P and configurations K identifiable therefrom can be determined and differentiated.

Equally, in the case of four displaceably mounted tracing pins 98 (not represented), there are sixteen different configurations K etc.

Figure 43A:
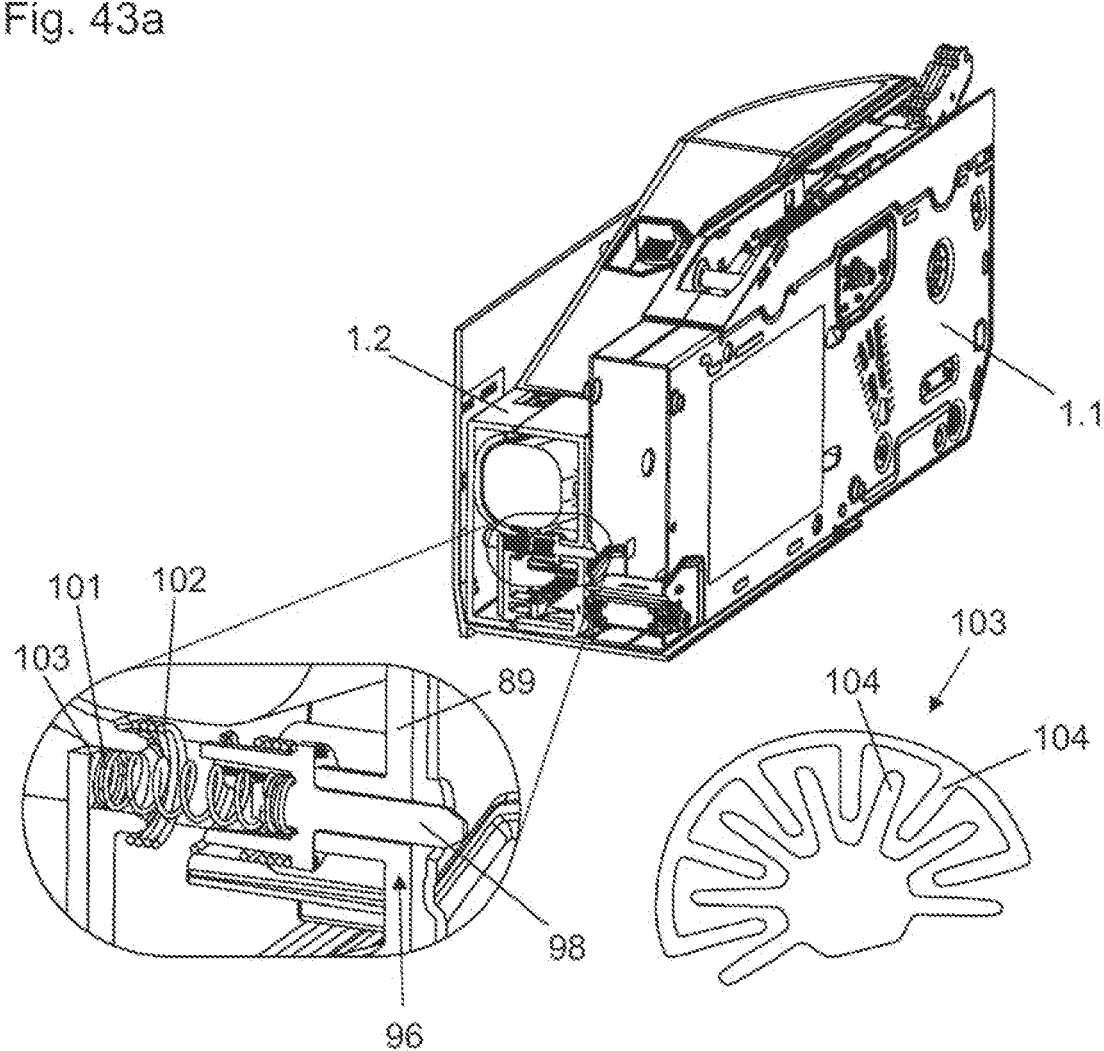
FIGS. 43a-44b show a furniture drive system and individual regions and component parts of this system in each case with a further preferred embodiment variant of the mechanical tracer element as a tracing pin.

FIG. 43a shows a further structural design of the mechanical tracer element 96 comprising one tracing pin 98. The displaceably mounted tracer element 96 (the number is generally as desired) can be brought into contact with a conductor path 103 (illustrated in the enlarged detailed section below the mechanical actuating drive 1.1), wherein the conductor path 103 comprises two conductor path contours 104 formed star-shaped, for determining a parameter P of the mechanical actuating drive 1.1.

Figure 43B:
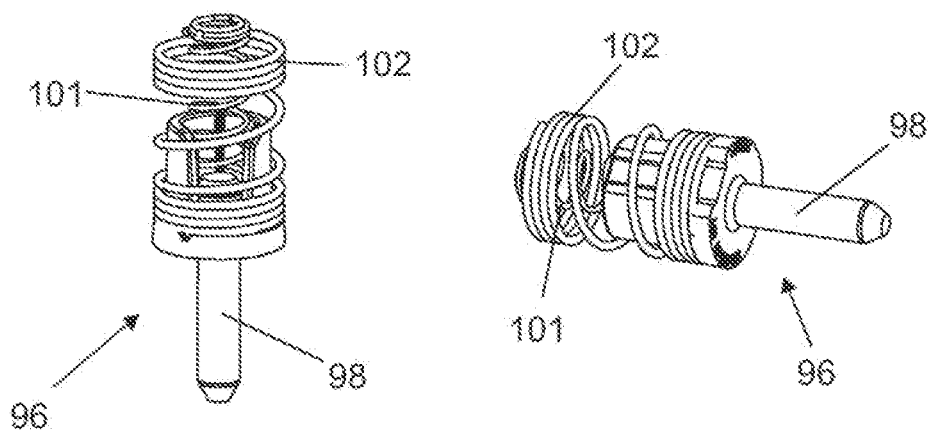

In FIG. 43b it can be seen that the displaceably mounted tracer element 96—comprising the tracing pin 98—comprises a first spring 101, which is arranged inside the tracing pin 98 in regions, for determining a parameter P of the mechanical actuating drive 1.1, and a second spring 102, which is arranged on the outside of the tracing pin 98 in regions.

The first spring 101 is galvanically isolated from the tracing pin 98 in the form of plastic or metal and can be brought into contact with both conductor path contours 104 of the conductor path 103.

Figure 44A:
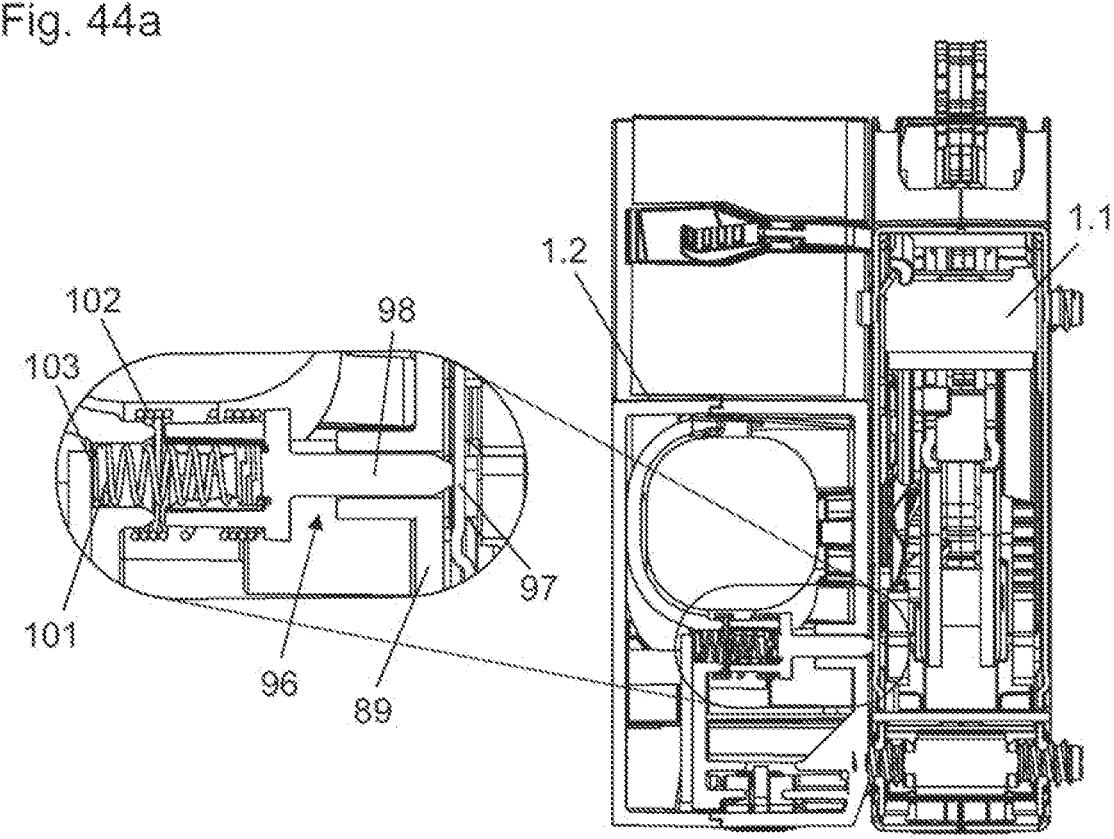

FIG. 44*a* shows the electric motor-powered furniture drive 1.2 attached to the mechanical actuating drive 1.1. The mechanical actuating drive 1.1 can (generally possible in the case of all embodiments) be ascertained via a combination of a parameter P determined via the identification device 91 and an opening angle of the mechanical actuating drive 1.1, wherein the opening angle can be determined (for example through a maximum angle of inclination or a specific angle between two end positions of the mechanical actuating drive 1.1) through a reference movement of the furniture drive system 1. For the identification of this mechanical actuating drive 1.1, the tracer element counterpiece 97 acts as a counter bearing, with the result that the first spring 101 contacts the conductor path 103—both conductor path contours 104.

In general, the displaceably mounted tracer element 96 can have exactly one or a large number of separate tracing pin(s) 98 protruding from the interface 90 at right angles to the vertical plane, wherein the displaceably mounted tracer element 96 can be arranged on the conductor path 103 and is optionally arranged on the mechanical actuating drive 1.1 for contacting a defined region of the conductor path 103 (the mechanical tracer element 96 is preferably arranged on the housing part 89). As a result, an identification of the mechanical actuating drive 1.1 can be effected with a reduced number of mechanical tracer elements 96 via a defined positioning of the tracing pin 98.

Figure 44B:
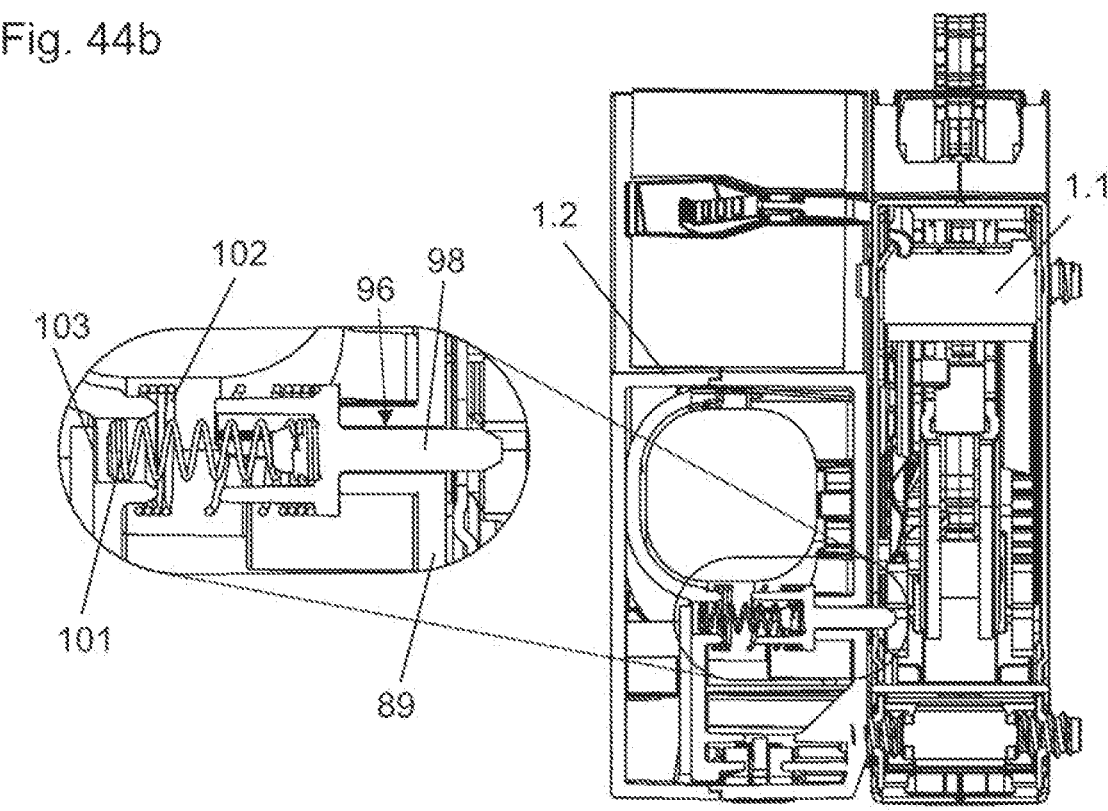

FIG. 44*b* shows that, for the identification of this mechanical actuating drive 1.1, no tracer element counterpiece 97 functions as a counter bearing, with the result that the first spring 101 is situated contactless with respect to the conductor path 103 through a spacing. Structural details of the displaceably mounted mechanical tracer element 96 (cf. FIG. 41)—such as for example the protrusion 99—can be applied as an alternative or supplement in the case of this embodiment of the mechanical tracer element 96.

Finally, the two following (not represented) embodiment variants may also be mentioned.

It can be provided that only the configuration K with respect to the power factor L can be identified via the identification device 91. For the identification of the HF, HS and HL types of furniture flap, a travel measuring device—for example as described in EP 2 315 891 B1—can be provided, by which the travel that can be covered by the actuating arm between its two end positions can be ascertained, wherein the type of furniture flap can be identified in dependence on the measurement result of this travel measuring device. There is thus a mixed variant between the identification according to the invention during the connection and the identification of a configuration through the actuating arm movement.

Previously, the mechanical tracer element 96 was always described as a protruding component part. However, it is entirely possible that this mechanical tracer element 96 is formed as an indentation and the tracer element counterpiece 97 is formed as a corresponding counterpiece, wherein the same basic principles apply to the identification in the case of this mechanical inversion.

LIST OF REFERENCE NUMBERS

1 furniture drive system
1.1 mechanical actuator unit
1.2 electrical drive unit
2 movable furniture part
2*a* first furniture flap
2*b* second furniture flap
3 furniture carcass
3*a* side wall
4 support
5 actuating arm device
5*a* first damping transmission element
5*b* second damping transmission element
51 transmission mechanism
52 actuating arm
53 control cam
54 pressure roller
55 stop
56 stop element
57 axle pin
58 actuator
59 transmission opening
6 energy storage mechanism
7 damping device
71 damper housing
72 damper piston
73 damping means
74 stop counterpiece
8 damper setting unit
8*a* setting means
8*x* setting axle pin
8*b*, 8*c* indentations
9*a* hinges
9*b* hinges
10 ceiling
11 actuating arm extension
11*a* first actuating arm part
11*b* second actuating arm part
12 fastening device
14 energy storage mechanism setting unit
14*a* setting wheel
15 point of application
16 threaded spindle
17*a* opening
19 intermediate lever
19*a* pivot pin
20 installation safety device
20*a* centrifugal clutch
21 power supply unit
22 detecting device
23 protective faceplate
24 cover
25 engagement opening
26 exit opening
30 electric motor
31 driver
32 gear mechanism
33 pivot pin
34 cogwheel (gear stage)
35 cogwheel (gear stage)
36 cogwheel (gear stage)
37 cogwheel (gear stage)
38 cogwheel (gear stage)
39 cogwheel (gear stage)
40 worm gear (gear stage)
41 freewheel clutch
42 overload clutch
43 damping device
44 control device
88 compression spring 89 housing part
90 interface
91 identification device
92 sensor
93 connecting plate
94 connecting elements
95 connecting counterpieces
96 mechanical tracer element
97 tracer element counterpiece
98 tracing pin
99 protrusion
100 piece of furniture
101 first spring
102 second spring
103 conductor path
104 conductor path contour
A drive device
D damping starting position
S closing movement
O opening movement
SS closed position
OS maximum open position
X pivot pin
H indication signal
K configuration
F data sets
P parameter of the mechanical actuating drive 1.1
$K_{akt}$ current configuration
T axis of rotation
B tracing surface
B1 tracing line closest to the interface
B2 tracing line furthest from the interface
N tracing lug
HF bi-fold lift flap
HS up and over lift flap
HL lift up flap
L power factor
I control signal

The invention claimed is:

1. An electric motor-powered furniture drive comprising:
at least one electric motor;
at least one interface, via which the electric motor-powered furniture drive can be connected to a mechanical actuating drive; and
at least one identification device for automatic identification of a configuration of the mechanical actuating drive,
wherein the at least one identification device is arranged on the at least one interface at least in regions such that the configuration of the mechanical actuating drive can be identified when the electric motor-powered furniture drive is connected to the mechanical actuating drive.

2. The electric motor-powered furniture drive according to claim 1, wherein the at least one electric motor can be controlled by a control device.

3. The electric motor-powered furniture drive according to claim 2, wherein several data sets relating to different configurations of the mechanical actuating drive are stored in the control device.

4. The electric motor-powered furniture drive according to claim 3, wherein the at least one identification device has a sensor via which a parameter of the mechanical actuating drive can be detected.

5. The electric motor-powered furniture drive according to claim 4, wherein the at least one identification device can carry out a comparison of the parameter detected by the sensor with the several data sets and identify the configuration of the mechanical actuating drive, and wherein, via the control device, control signals can be output to the at least one electric motor depending on the configuration of the mechanical actuating drive identified via the at least one identification device.

6. The electric motor-powered furniture drive according to claim 1, wherein the at least one interface has a substantially flat connecting plate and connecting elements arranged on the substantially flat connecting plate for releasable connection of the electric motor-powered furniture drive to connecting counterpieces on the mechanical actuating drive.

7. The electric motor-powered furniture drive according to claim 6, wherein the at least one identification device has at least one mechanical tracer element, which has at least two separate tracing pins protruding from the at least one interface.

8. The electric motor-powered furniture drive according to claim 6, wherein the at least one identification device has at least one mechanical tracer element, which can be brought into contact with a conductor path including at least one conductor path contour.

9. The electric motor-powered furniture drive according to claim 8, wherein the at least one mechanical tracer element includes a first spring for determining a parameter of the mechanical actuating drive, and the first spring is galvanically isolated from a tracing pin or can be brought into contact with the conductor path.

10. The electric motor-powered furniture drive according to claim 6, wherein the at least one identification device has at least one mechanical tracer element, which includes a first spring for determining a parameter of the mechanical actuating drive, or a second spring on an outside of the at least one mechanical tracer element.

11. The electric motor-powered furniture drive according to claim 6, wherein the at least one identification device has at least one mechanical tracer element, which has at least one tracing pin protruding from the at least one interface.

12. The electric motor-powered furniture drive according to claim 1, wherein the at least one identification device has at least one mechanical tracer element, which is rotatably mounted on the at least one interface.

13. The electric motor-powered furniture drive according to claim 12, wherein the at least one mechanical tracer element is rotatable about an axis of rotation, and the at least one mechanical tracer element has a tracing surface that faces away from the at least one interface and is inclined relative to the axis of rotation.

14. The electric motor-powered furniture drive according to claim 13, wherein the tracing surface has a first tracing line closest to the at least one interface, lying on the tracing surface and leading away from the axis of rotation, and a second tracing line furthest from the at least one interface, lying on the tracing surface and leading away from the axis of rotation.

15. The electric motor-powered furniture drive according to claim 14, wherein the first tracing line and the second tracing line are 180° apart from each other starting from the axis of rotation.

16. The electric motor-powered furniture drive according to claim 14, wherein the second tracing line defines a tracing lug that can be moved into at least one tracer element counterpiece of the mechanical actuating drive.

17. The electric motor-powered furniture drive according to claim 1, wherein the at least one identification device has at least one mechanical tracer element, which rests against at least one tracer element counterpiece of the mechanical actuating drive, representing a parameter of the mechanical actuating drive, when the electric motor-powered furniture drive is connected to the mechanical actuating drive via the at least one interface.

18. The electric motor-powered furniture drive according to claim 17, wherein the at least one mechanical tracer element is movably mounted on the at least one interface.

19. The electric motor-powered furniture drive according to claim 1, wherein the mechanical actuating drive can be ascertained via a combination of at least one parameter determined via the at least one identification device and an opening angle of the mechanical actuating drive.

20. A furniture drive system for a movable furniture part, the furniture drive system comprising:
the electric motor-powered furniture drive according to claim 1; and
the mechanical actuating drive.

21. The furniture drive system according to claim 20, wherein the mechanical actuating drive includes:
a support for fitting the furniture drive system on a furniture carcass;
an actuating arm device that is movably mounted on the support and can be connected to the movable furniture part, wherein the at least one electric motor is connected or can be connected to the actuating arm device and can be used to move the actuating arm device at least in portions; and
at least one energy storage mechanism which, on a first side, is configured to engage on the support, and on a second side, is configured to engage on the actuating arm device.

22. The furniture drive system according to claim 20, wherein:
the electric motor-powered furniture drive is an assembly separate from the mechanical actuating drive and the electric motor-powered furniture drive and the mechanical actuating drive can be connected or are connected to each other via the at least one interface; and
the electric motor-powered furniture drive has a driver, which can be driven by the at least one electric motor, for transmitting a torque of the at least one electric motor to the actuating arm device of the mechanical actuating drive.

23. The furniture drive system according to claim 20, wherein
the movable furniture part includes a bi-fold lift flap and the configuration of the mechanical actuating drive is for the bi-fold lift flap;
the movable furniture part includes an up and over lift flap and the configuration of the mechanical actuating drive is for the up and over lift flap;
the movable furniture part includes a lift up flap and the configuration of the mechanical actuating drive is for the lift up flap; or
the configuration of the mechanical actuating drive includes plural mechanical actuating drives, which are constructed substantially identically and differ from each other by a power factor of at least one energy storage mechanism.

24. A piece of furniture comprising:
the furniture drive system according to claim 20;
the movable furniture part; and
a furniture carcass.

25. A method of operating the furniture drive system according to claim 20, the method comprising:
connecting the electric motor-powered furniture drive to the mechanical actuating drive via the at least one interface; and
automatically identifying the configuration of the mechanical actuating drive via the at least one identification device when the electric motor-powered furniture drive is connected to the mechanical actuating drive via the at least one interface.

26. The method according to claim 25, further comprising:
detecting a parameter of the mechanical actuating drive via a sensor of the at least one identification device;
comparing the parameter detected by the sensor with stored data sets relating to different configurations of the mechanical actuating drive;
identifying the current configuration of the mechanical actuating drive with reference to the stored data sets; and
outputting a control signal to the at least one electric motor based on the current configuration of the mechanical actuating drive identified via the at least one identification device.

* * * * *